US011194840B2

(12) United States Patent
Meyerzon et al.

(10) Patent No.: US 11,194,840 B2
(45) Date of Patent: Dec. 7, 2021

(54) INCREMENTAL CLUSTERING FOR ENTERPRISE KNOWLEDGE GRAPH

(71) Applicant: Microsoft Technology Licensing, LLC, Redmond, WA (US)

(72) Inventors: Dmitriy Meyerzon, Bellevue, WA (US); Jeffrey L. Wight, Kirkland, WA (US); Nikita Voronkov, Bothell, WA (US); Vladimir V. Gvozdev, Sammamish, WA (US); John Michael Winn, Cambridge (GB); John Guiver, Saffron Walden (GB); Ivan Korostelev, Cambridge (GB); Matteo Venanzi, London (GB); Alexander Armin Spengler, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 78 days.

(21) Appl. No.: 16/601,082

(22) Filed: Oct. 14, 2019

(65) Prior Publication Data
US 2021/0109952 A1     Apr. 15, 2021

(51) Int. Cl.
G06F 16/28       (2019.01)
G06F 16/2458    (2019.01)
G06F 16/901     (2019.01)

(52) U.S. Cl.
CPC ........ *G06F 16/285* (2019.01); *G06F 16/2465* (2019.01); *G06F 16/9024* (2019.01)

(58) Field of Classification Search
CPC . G06F 16/285; G06F 16/2465; G06F 16/9024
(Continued)

(56) References Cited

U.S. PATENT DOCUMENTS 9,589,069 B2   3/2017  Yang et al.
10,078,651 B2  9/2018  Kelly et al.
(Continued)

OTHER PUBLICATIONS

"Amazon Neptune", Retrieved from: https://web.archive.org/web/20190819015741/https:/aws.amazon.com/neptune/, Aug. 19, 2019, 14 Pages.

(Continued)

*Primary Examiner* — Evan Aspinwall
(74) *Attorney, Agent, or Firm* — Arent Fox LLP

(57) ABSTRACT

Examples described herein generally relate to a computer system including a knowledge graph storing a plurality of entities. The computer system compares source documents within an enterprise intranet to a plurality of templates defining potential entity attributes to identify extracts matching at least one of the plurality of templates. The computer system parses the extracts according to respective templates of the plurality of templates that match the extracts to determine instances. The computer system performs incremental clustering on a number of the instances to determine potential entity names. The computer system queries the knowledge graph with the potential entity names to obtain a set of candidate entity records. The computer system links the potential entity names with at least partial matching ones of the set of candidate entity records to define updated matching candidate entity records. The computer system updates the knowledge graph with the updated matching candidate entity records.

17 Claims, 12 Drawing Sheets

(58) Field of Classification Search
USPC .......................................................... 707/603
See application file for complete search history.

(56) References Cited

U.S. PATENT DOCUMENTS

| | | | |
|---|---|---|---|
| 10,108,700 | B2 | 10/2018 | Gupta et al. |
| 10,140,384 | B2 | 11/2018 | Sathish et al. |
| 10,810,193 | B1* | 10/2020 | Subramanya ....... G06F 16/9024 |
| 2006/0020595 | A1 | 1/2006 | Norton et al. |
| 2007/0112714 | A1 | 5/2007 | Fairweather |
| 2010/0042623 | A1 | 2/2010 | Feng et al. |
| 2012/0246175 | A1 | 9/2012 | Duan et al. |
| 2014/0282219 | A1* | 9/2014 | Haddock ................. G06F 16/36 715/781 |
| 2014/0324805 | A1 | 10/2014 | Agarwal et al. |
| 2015/0095303 | A1 | 4/2015 | Wu et al. |
| 2015/0317376 | A1 | 11/2015 | Bauer et al. |
| 2017/0364808 | A1 | 12/2017 | Fothergill et al. |
| 2018/0082183 | A1* | 3/2018 | Hertz ...................... G06F 16/36 |
| 2018/0165352 | A1* | 6/2018 | Huang ................ G06F 16/2379 |
| 2018/0232204 | A1 | 8/2018 | Ghatage et al. |
| 2018/0232443 | A1 | 8/2018 | Delgo et al. |
| 2019/0266336 | A1 | 8/2019 | Scheideler et al. |
| 2021/0110278 | A1 | 4/2021 | Meyerzon et al. |
| 2021/0133216 | A1 | 5/2021 | Meyerzon et al. |

OTHER PUBLICATIONS

"Mining Dynamic Knowledge Graphs", Retrieved from: https://www-druid.irisa.fr/mining-dynamic-knowledge-graphs/, Retrieved Date: Aug. 21, 2019, 3 Pages.

Fernandez, et al., "Aurum: A Data Discovery System", In Proceedings of IEEE 34th International Conference on Data Engineering, Apr. 16, 2008, 12 Pages.

Graham, et al., "Overview of Microsoft Graph", Retrieved from: https://web.archive.org/web/20190904180353/https://docs.microsoft.com/en-us/graph/overview, Jul. 31, 2019, 7 Pages.

He, et al., "Building the LinkedIn Knowledge Graph", Retrieved from: https://engineering.linkedin.com/blog/2016/10/building-the-linkedin-knowledge-graph, Oct. 6, 2016, 7 Pages.

Ivanov, Yanko, "What is an Enterprise Knowledge Graph and Why Do I Want One?", Retrieved from: https://enterprise-knowledge.com/what-is-an-enterprise-knowledge-graph-and-why-do-i-want-one/, Nov. 1, 2018, 4 Pages.

Kotov, Alexander, "Knowledge Graph Entity Representation and Retrieval", In 10th Russian Summer School in Information Retrieval, Aug. 22, 2016, 25 Pages.

Marino, Chris, "A Knowledge Graph Feast", Retrieved from: https://enterprise-knowledge.com/a-knowledge-graph-feast/, Nov. 20, 2018, 4 Pages.

Masuch, Lukas, "Enterprise Knowledge Graph—One Graph to Connect Them All", Retrieved from: https://www.managementexchange.com/hack/enterprise-knowledge-graph-one-graph-connect-them-all, Mar. 28, 2014, 8 Pages.

Moore, et al., "Knowledge Graphs: The Path to Enterprise AI", Retrieved from: https://neo4j.com/blog/knowledge-graphs-path-to-enterprise-ai/, Jul. 11, 2018, 25 Pages.

Song, et al., "Building and Querying an Enterprise Knowledge Graph", In Journal of IEEE Transactions on Services Computing, vol. 12, Issue 3, May 2019, pp. 356-369.

"International Search Report and Written Opinion issued in PCT Application No. PCT/US20/056953", dated Feb. 19, 2021, 10 Pages.

"Non Final Office Action Issued in U.S. Appl. No. 16/735,262", dated May 6, 2021, 18 Pages.

* cited by examiner

INCREMENTAL CLUSTERING FOR ENTERPRISE KNOWLEDGE GRAPH

BACKGROUND

The present disclosure relates to knowledge graphs, and more particularly to proprietary knowledge graphs for an enterprise.

Search engines and conversational assistants require huge stores of knowledge in order to answer questions and understand basic facts about the world. Such a store of knowledge is referred to as a knowledge graph or knowledge base and comprises facts about entities and relations between the entities. Forming knowledge graphs which are accurate, up-to-date, and complete remains a significant challenge.

A proprietary knowledge graph for an enterprise faces particular challenges in that the information to be stored in the knowledge graph may be confidential to the enterprise. The enterprise may lack the ability to design a knowledge graph, but may also be unwilling to share the underlying information with a third party.

The embodiments described below are not limited to implementations which solve any or all of the disadvantages of known knowledge graph construction systems.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a computer system including a knowledge graph storing a plurality of entities associated with an enterprise; a memory storing computer-executable instructions; and a processor configured to execute the instructions. The processor may be configured to compare enterprise source documents within an enterprise intranet to a plurality of templates defining potential entity attributes to identify extracts of the enterprise source documents matching at least one of the plurality of templates. The processor may be configured to parse the extracts according to respective templates of the plurality of templates that match the extracts to determine instances. The processor may be configured to perform clustering on a number of the instances to determine potential entity names. The processor may be configured to query the knowledge graph with the potential entity names to obtain a set of candidate entity records. The processor may be configured to link the potential entity names with at least partial matching ones of the set of candidate entity records to define updated matching candidate entity records including attributes corresponding to instances associated with the potential entity names. The processor may be configured to update the knowledge graph with the updated matching candidate entity records and with new entity records for unmatched potential entity names, wherein the unmatched potential entity names are defined by ones of the potential entity names that do not match with any of the set of candidate entity records.

The disclosure also provides a method of incrementally building a knowledge graph storing a plurality of entities associated with an enterprise. The method may include comparing enterprise source documents within an enterprise intranet to a plurality of templates defining potential entity attributes to identify extracts of the enterprise source documents matching at least one of the plurality of templates. The method may include parsing the extracts according to respective templates of the plurality of templates that match the extracts to determine instances. The method may include performing clustering on a number of the instances to determine potential entity names. The method may include querying the knowledge graph with the potential entity names to obtain a set of candidate entity records. The method may include linking the potential entity names with at least partial matching ones of the set of candidate entity records to define updated matching candidate entity records including attributes corresponding to instances associated with the potential entity names. The method may include updating the knowledge graph with the updated matching candidate entity records and with new entity records for unmatched potential entity names, wherein the unmatched potential entity names are defined by ones of the potential entity names that do not match with any of the set of candidate entity records.

The disclosure also provides a non-transitory computer-readable medium storing computer-executable instructions that when executed by a computer processor cause the computer processor to incrementally build a knowledge graph storing a plurality of entities associated with an enterprise. The non-transitory computer-readable medium may include instructions to compare enterprise source documents within an enterprise intranet to a plurality of templates defining potential entity attributes to identify extracts of the enterprise source documents matching at least one of the plurality of templates. The non-transitory computer-readable medium may include instructions to parse the extracts according to respective templates of the plurality of templates that match the extracts to determine instances. The non-transitory computer-readable medium may include instructions to perform clustering on a number of the instances to determine potential entity names. The non-transitory computer-readable medium may include instructions to query the knowledge graph with the potential entity names to obtain a set of candidate entity records. The non-transitory computer-readable medium may include instructions to link the potential entity names with at least partial matching ones of the set of candidate entity records to define updated matching candidate entity records including attributes corresponding to instances associated with the potential entity names. The non-transitory computer-readable medium may include instructions to update the knowledge graph with the updated matching candidate entity records and with new entity records for unmatched potential entity names, wherein the unmatched potential entity names are defined by ones of the potential entity names that do not match with any of the set of candidate entity records.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

Figure 1:
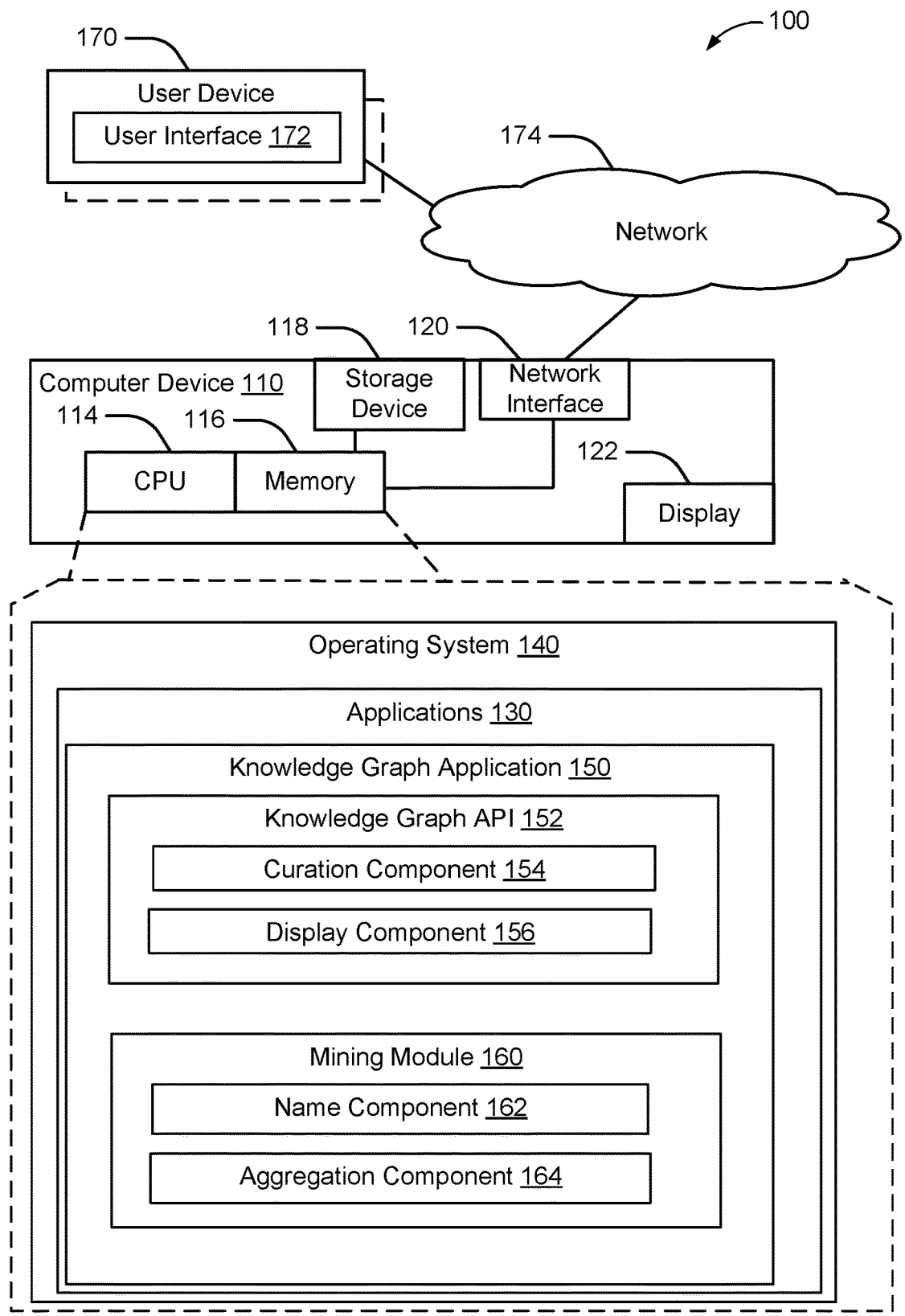
FIG. 1 is a schematic block diagram of an example system for generating, updating, and accessing a knowledge graph, in accordance with an implementation of the present disclosure.

The present disclosure provides systems and methods for generating, maintaining, and using a knowledge graph for an enterprise. A computer system, e.g., a local or remote server, generates an enterprise knowledge graph based on enterprise source documents accessible via an intranet. The computer system performs a mining of the enterprise source documents for entity names such as project names, organization names, product names, etc. The mining may include comparing enterprise source documents within an enterprise intranet to a plurality of templates defining potential entity attributes to identify extracts of the enterprise source documents matching at least one of the plurality of templates. The computer system parses the extracts according to respective templates of the plurality of templates that match the extracts to determine instances. The computer system performs clustering on a number of the instances to determine potential entity names. The names may be unique to the enterprise such that external sources of the entity names are not available. Accordingly, when a computer system observes multiple instances of a name being used in documents, there may be a level of uncertainty as to whether the name is the correct name for an entity, or whether the name refers to different entities. In various implementations, the present disclosure uses a clustering process to evaluate the uncertainty associated with instances and determine a most likely name, which is referred to as a mined entity name.

The computer system generates an entity record for at least one of the mined entity names based on a schema for the entity. The entity record includes attributes aggregated from the enterprise source documents associated with the mined entity name. The entity record is stored in the knowledge graph. A user within the enterprise that is associated with the entity record and has permissions to edit the entity can perform a curation action on the entity record, and the computer system can update the entity record based on the curation action. Accordingly, as the knowledge graph is accessed and curated by users, the knowledge graph develops into a combination of machine-learned knowledge and user curated knowledge. The computer system may display an entity page including at least a portion of the attributes of the entity record to other users based on permissions of each user to view the enterprise source documents. Accordingly, users within the enterprise may easily access information about the enterprise according to permissions of the underlying source documents.

One issue with using a clustering process to resolve uncertainty is that a clustering process may become infeasible given limited computing resources and a large number of source documents. As more documents are added, eventually the clustering process consumes a disproportionate amount of computing resources including memory and processor cycles. With a large set of documents, a complete clustering process over the set of documents may not be completed before additional documents are added.

The present disclosure includes implementations that include performing the clustering process incrementally on a limited number of instances in order to reduce the use of computing resources. The limited number of instances can be configured to improve feasibility and/or speed of the clustering process. Incremental clustering can also be used to update an existing knowledge graph based on new source documents without having to mine the full set of source documents. Incremental clustering includes comparing enterprise source documents within an enterprise intranet to a plurality of templates defining potential entity attributes to identify extracts of the enterprise source documents matching at least one of the plurality of templates. The computer system parses the extracts according to respective templates of the plurality of templates that match the extracts to determine instances. The computer system performs clustering on a number of the instances to determine potential entity names. The computer system then queries the knowledge graph with the potential entity names to obtain a set of candidate entity records. The incremental clustering includes linking the potential entity names with at least partial matching ones of the set of candidate entity records to define updated matching candidate entity records including attributes corresponding to instances associated with the potential entity names. The computer system can update the knowledge graph with the updated matching candidate entity records and with new entity records for unmatched potential entity names, wherein the unmatched potential entity names are defined by ones of the potential entity names that do not match with any of the set of candidate entity records.

Referring now to FIG. 1, an example knowledge graph system 100 includes a central computer device 110 and a plurality of user devices 170. The central computer device 110 may be, for example, a mobile or fixed computer device including but not limited to a computer server, desktop or laptop or tablet computer, a cellular telephone, a personal digital assistant (PDA), a handheld device, any other computer device having wired and/or wireless connection capability with one or more other devices, or any other type of computerized device capable of processing user interface data.

The computer device 110 may include a central processing unit (CPU) 114 that executes instructions stored in memory 116. For example, the CPU 114 may execute an operating system 140 and one or more applications 130, which may include a knowledge graph application 150. The computer device 110 may also include a network interface 120 for communication with external devices via a network 174, which may be an enterprise intranet. For example, the computer device 110 may communicate with a plurality of user devices 170.

The computer device 110 may include a display 122. The display 122 may be, for example, a computer monitor or a touch-screen. The display 122 may provide information to an operator and allow the operator to configure the computer device 110.

Memory 116 may be configured for storing data and/or computer-executable instructions defining and/or associated with an operating system 140 and/or applications 130, and CPU 114 may execute operating system 140 and/or applications 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the computer device 110 may include a storage device 118, which may be a non-volatile memory.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The applications 130 may include knowledge graph application 150 configured to generate, manage, and display a knowledge graph storing information regarding an enterprise. The knowledge graph application 150 includes a knowledge graph API 152 that allows a user device 170 or an application executing on a user device 170 to access specific functions of the knowledge graph application 150. For example, the knowledge graph API 152 includes a curation component 154 that receives curation actions from a user. As another example, the knowledge graph API 152 includes a display component 156 that displays at least a portion of an entity page stored in the knowledge graph to a user.

The knowledge graph application 150 includes a mining module 160 that generates and updates entity records to be stored in the knowledge graph. The mining module 160 includes a name component 162 that mines enterprise source documents for entity names and other entity metadata. The mining module 160 includes an aggregation component 164 that aggregates information from the enterprise source documents to generate entity records for entity names mined from the enterprise source documents. The other entity metadata may include people relations, document relations, and dates.

Figure 2:
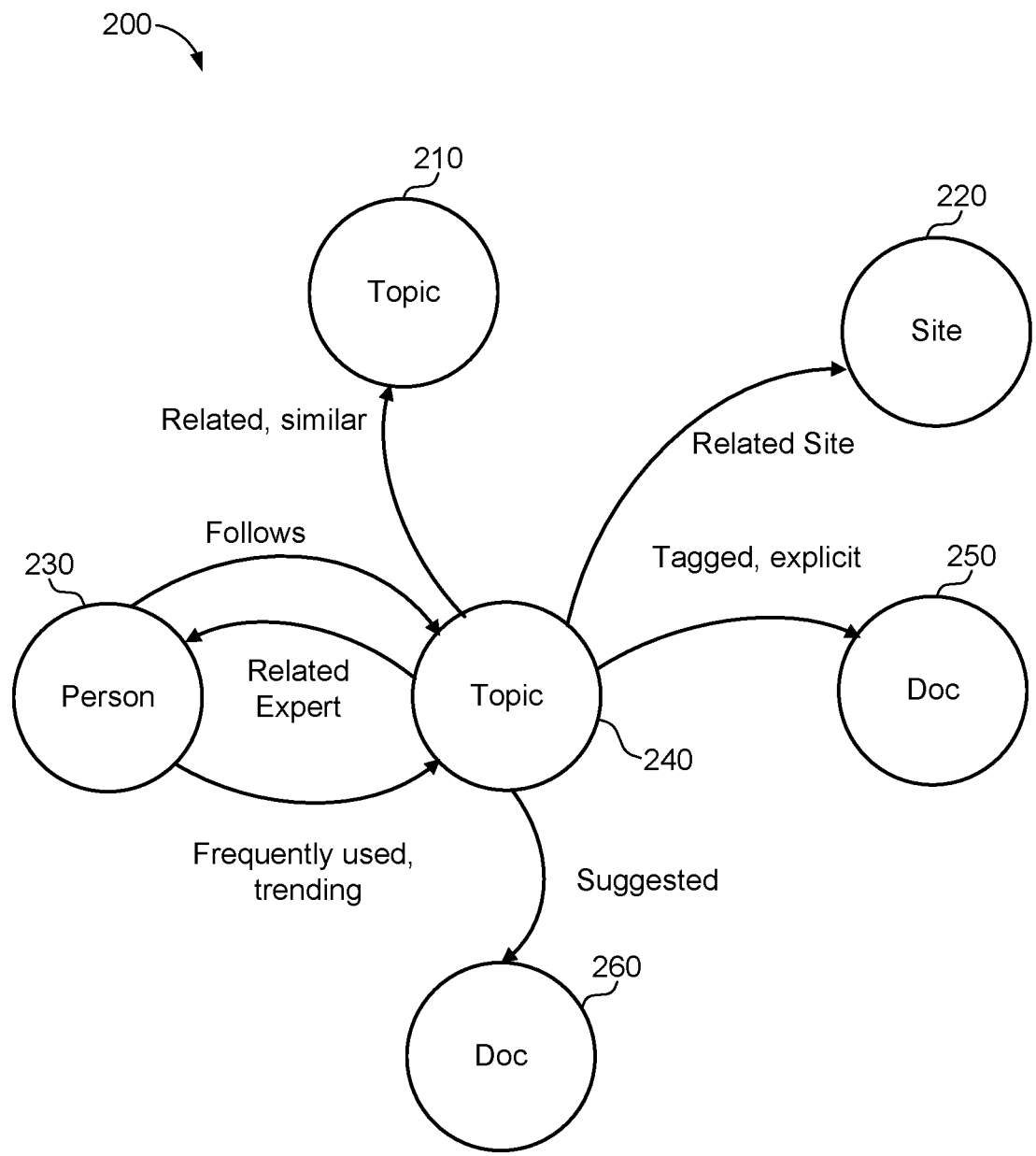
FIG. 2 is a schematic diagram of an example knowledge graph.

Referring now to FIG. 2, an example knowledge graph 200 includes entities 210, 220, 230, 240, 250, 260 and relationships between the entities. In an implementation, each entity is represented by an entity record, which includes attributes that describe the entity. For example, an attribute can store an attribute value or a link to another entity that is related to the entity. A schema for an entity type defines the attributes of the entity.

As illustrated, the example knowledge graph 200 is a partial knowledge graph including entities related to a topic entity 240. For example, another topic entity 210 is related to the topic entity 240 as a related, similar topic. As another example, a site entity 220 is related to the topic entity 240 as a related site. The site entity 220 may be, for example, a website. As another example, the document entity 250 is related to the topic entity 240 as a tagged, explicit document. For example, the document entity 250 can be tagged by a user curating a topic page for the topic entity 240. As a final example, the document entity 260 is related to the topic entity 240 as a suggested document.

Figure 3:
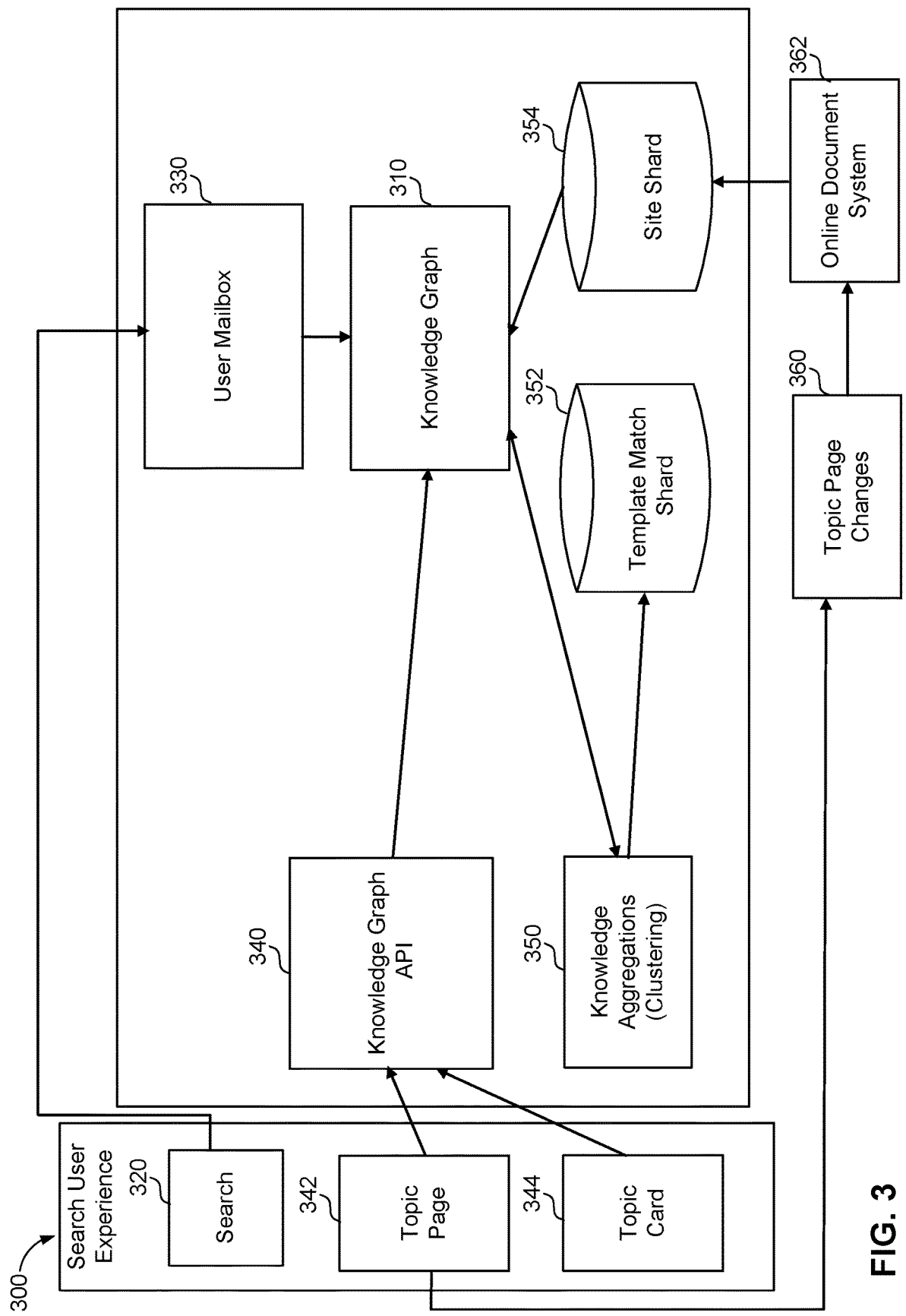
FIG. 3 is a schematic diagram of an example system architecture providing a search user experience for accessing a knowledge graph, in accordance with an implementation of the present disclosure.

FIG. 3 illustrates an example implementation of a system architecture for providing a search user experience utilizing a knowledge graph 310. The knowledge graph 310 is a knowledge graph including entities and relationships as discussed above regarding the example knowledge graph 200. The search user experience can be implemented using private cloud services, enterprise servers, on-premises equipment, or a combination thereof.

A user interface (e.g., user interface 172) includes a search tool 320 that allows searching of the knowledge graph 310. The architecture 300 may be implemented using an enterprise mail system with mailboxes corresponding to particular tasks and particular documents. For instance, a user mailbox 330 receives search requests for the knowledge graph 310.

In an implementation, the knowledge graph 310 may be generated based on mailboxes, but may use another system (e.g., a file management system) to process individual documents. A knowledge aggregations process 350, which is also be referred to herein as clustering, is a batch process responsible for getting enterprise source documents for mining and performing a mining process. The knowledge aggregations process 350 generates or updates the knowledge graph 310 based on the enterprise source documents. For instance, the knowledge aggregations process 350 performs a clustering process on template matches or instances, which are potential entity names extracted from the enterprise source documents and stored in the template match shard 352. The knowledge aggregations process 350 generates new entity records to store in the knowledge graph 310 based on the potential entity names.

The user interface retrieves information from the knowledge graph 310 in the form of a topic page 342 or a topic card 344 via a knowledge graph API 340, which corresponds to the knowledge graph API 152. A topic page 342 is a document for a user including information from the knowledge graph 310 that the user is permitted to view. The permissions to view information from the knowledge graph 310 are based on permissions to view the enterprise source documents that support the entity record in the knowledge graph 310. Accordingly, users cannot use the knowledge graph 310 to gain access to information in source documents to which they do not already have access. A topic card 344 is a display of a subset of information in a topic page 342. A topic card 344 may be integrated into an application for viewing an enterprise source document. For example, an email reader application may highlight or link words in an email to entities in the knowledge graph 310. A user can access the topic card 344 for an entity within the application, for example, by selecting the highlighted or linked word.

A user can curate a topic page 342 by performing a curation action. Curation actions include adding or removing attributes of an entity record including relationships to other entity records. As explained in further detail below, permission to curate a topic page 342 depends on the permissions of the user with respect to the topic page 342. In some cases, multiple topic pages for the same topic are created to show different information to different users. When the user performs a curation action, the topic page changes 360 are provided to an online document system 362 that stores the changes in a site shard 354. The knowledge aggregations process 350 updates the knowledge graph 310 based on the site shard 354 bypassing the clustering process. That is, the curation action provides a feedback to the clustering process because the curation actions populate explicit entities and relationships in the knowledge graph. These explicit entities provide positive labels for inference. Topic pages and relationships serve as authoritative data to seed the set of topics for clustering, which may allow the machine learning process (i.e., clustering) to link more data (e.g., people, files, sites) to the entity than only a mined entity name. Similarly, negative curation actions (e.g., deleting a related entity) may be used to infer a reliability of a template that generated the deleted relationship.

Figure 4:
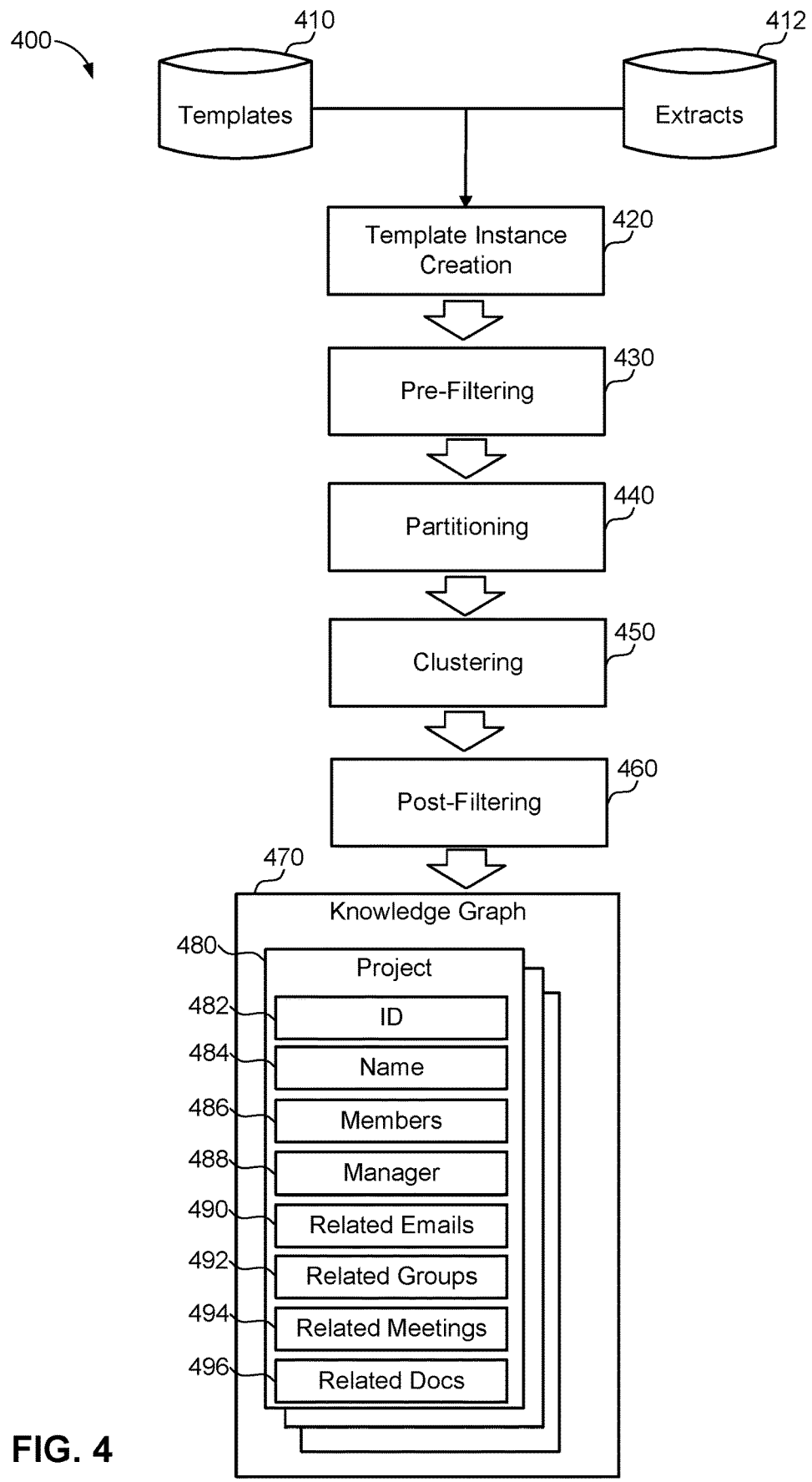
FIG. 4 is a conceptual diagram of an example mining process, in accordance with an implementation of the present disclosure.

Turning to FIG. 4, an example mining process 400 analyzes templates 410 and extracts 412 to generate entities to add to knowledge graph 470. The mining process 400 may be performed for a particular entity type such as a project, which may be defined by a schema. A project is an example of a topic that may be included in the knowledge graph 470. More generally, the mining process 400 identifies potential topic names within the templates 410 and extracts 412. Templates 410 are text or other formatted data with placeholders to insert formatted values of properties of an entity. An entity is an instance of an entity type, and is also referred to herein as an entity record. There are typically many templates per entity type, and these may be represented as a probability distribution over string values, or may be enumerated into a list. Templates combine the formatted property value into text or other formatted data. In an enterprise context, source documents are associated with metadata such as people (e.g., authors, recipients, owners), dates, and changes, which can be used to evaluate uncertainty regarding entity names and to identify relationships between entities.

An extract 412 is a portion of a source document that at least partially matches a template. Templates 410 are used to generate extracts 412 using queries. For example, a query for the template on a set of enterprise source documents compares the template 410 to each of the source documents to identify extracts 412 within the set of enterprise source documents. The extracts 412 at least partially match the template 410. An example extract 412 is a string including the formatted data of the template 410 and additional data, which corresponds to the placeholders in the template 410. Another example of an extract 412 is a subject line of an email having metadata that matches a template defining metadata (e.g., having a sender email address of a person who approves new projects).

The mining process 400 includes template instance creation process 420 in which extracts 412 are evaluated to determine an uncertainty regarding an entity name (e.g., a project name) associated with each extract 412. The template instance creation process 420 captures the uncertainty around the template match as a string distribution (e.g., alternative strings each associated with a probability).

The mining process 400 optionally includes pre-filtering process 430 in which the system automatically identifies common words that appear in more than a threshold percentage of the instances. Common words associated with a project name include "The," "Project," "Leads" or "Leader." Accordingly, pre-filtering process 430 can be used to improve uncertainty surrounding names by removing common or optional words, which may not occur in every instance of the name.

The mining process 400 includes partitioning process 440 in which the instances are partitioned by all possible entity names. As noted above, the template instance may be represented by a string distribution. In partitioning process 440, instances having overlapping strings may form a single partition. For example, partitioning 340 would group instances having the terms "Project Valkyrie," "Valkyrie" and "Valkyrie Leader" into a single partition, whereas an instance with the term "Sunlamp group" would be in a separate partition.

The mining process 400 includes clustering process 450 in which instances within a partition are clustered to identify project names. The clustering process 450 is performed for each partition either sequentially or in parallel utilizing multiple processors. Clustering process 450 is an unsupervised machine learning process in which the instances are loaded into memory and clustering metadata defining probability distributions between instances are calculated until a stable probability distribution is reached. For example, in an implementation the clustering process 450 may perform Bayesian inference of the probability distribution for each entity. Those entity names with a probability higher than a threshold may be considered established entities, whereas entity names with a probability less than the threshold may be considered formative entities.

The mining process 400 optionally includes post-filtering process 460 in which identified entity names that do not correspond to a target entity type are removed. For example, enterprise documents can include a large number of extracts that refer to a common topic such as a holiday and have similar attributes as a project (e.g., a date, events, people) that are peripheral to the concept of a project. Accordingly, the clustering process 450 would identify those extracts as being related and identify a potential entity name (e.g., the holiday name). The post-filtering process 460 determines that the potential entity name does not correspond to the target entity when none of the clustered instances for the potential entity name match a key template for the entity. For example, a key template for a project entity type includes the word "Project."

The mining process 400 generates entity records such as the project entity record 480 within the knowledge graph 470 based on the mined entity names, associated attributes, and schemas for the entity type. The schema defines attributes within an entity record for an entity type. For example, a project schema defines a project entity record 480 for a project entity type. For instance, the schema for a project entity includes an ID attribute 482, name attribute 484, members attribute 486, manager attribute 488, related emails attribute 490, related groups attribute 492, related meetings attribute 494, and related documents attribute 496. The project entity record 480 includes zero or more attribute values for each attribute. A mandatory attribute may have at least one attribute value. For example, the ID attribute 492, name attribute 484, and members attribute 486 may be mandatory attributes. The mining process 400 populates the attribute values in the project entity record 480 based on the set of enterprise source documents associated with the mined entity name. Accordingly, the project entity record 480 includes attributes aggregated from the set of enterprise source documents associated with the mined entity name.

Figure 5:
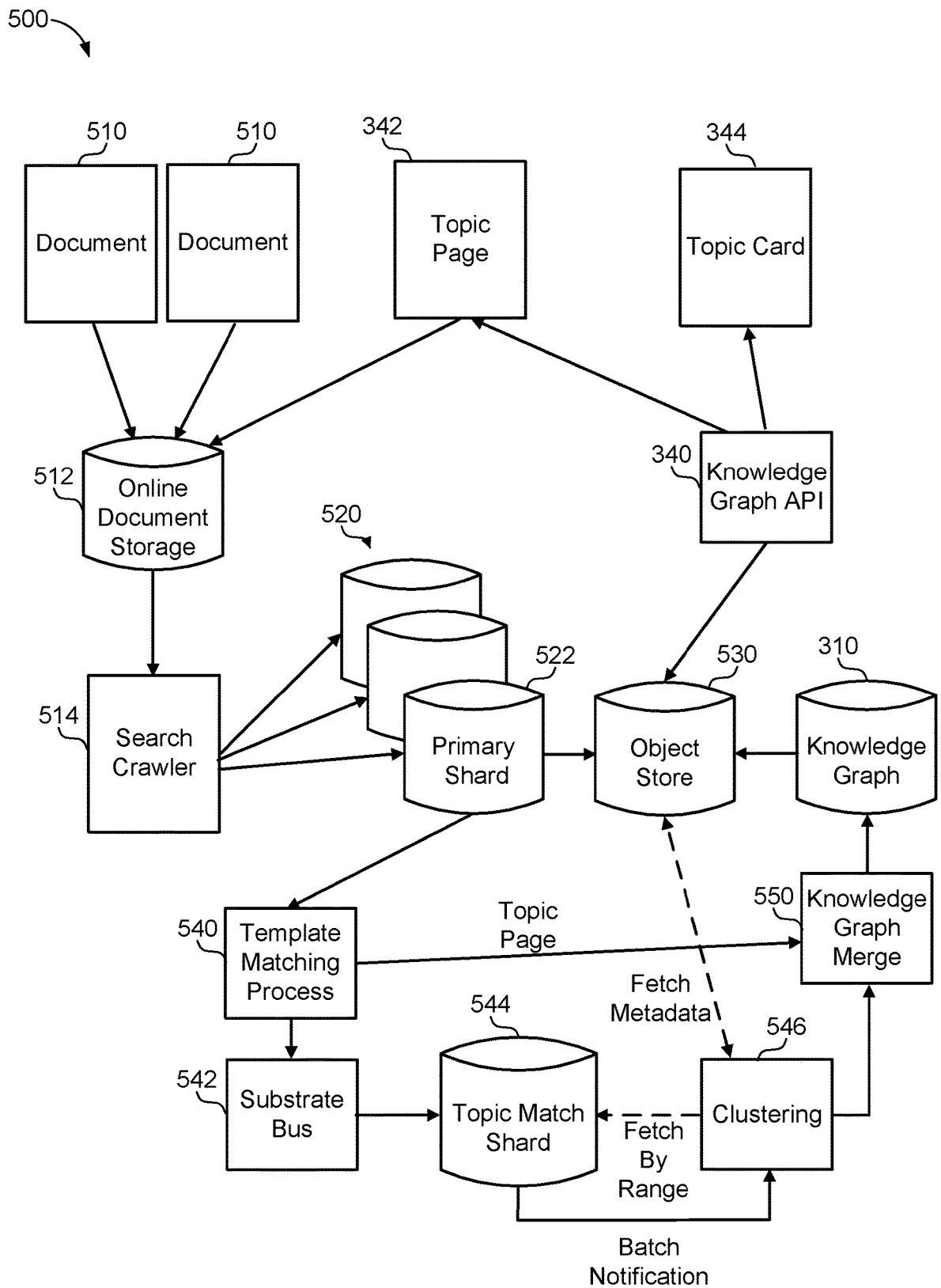
FIG. 5 is a schematic diagram of an example system architecture for managing a knowledge graph, in accordance with an implementation of the present disclosure.

Turning to FIG. 5, an example architecture 500 for generating, managing, and accessing a knowledge graph performs a mining of documents 510 to generate the knowledge graph 310, which is stored in an object store 530. A user can access the knowledge graph 310 via the knowledge graph API 340, which displays a topic page 342 and/or a topic card 344.

The documents 510 are user documents saved to an online document storage 512 within the enterprise intranet. For example, user documents include word processing documents, intranet sites, emails, calendar items, group conversations, group meetings, and other documents generated by the enterprise and stored in the online document storage 512. A search crawler 514 picks up the new document or updated document and pushes the document to a mailbox 520. Mailboxes 520 are grouped into shards 522 including a primary shard. The mailboxes 520 or shards 522 perform analytics to determine metrics for documents such as most popular documents. In an implementation with a distributed architecture, the shards may be associated with geographic regions and there may be at least one shard per region of the enterprise. Data mined or extracted from a document may be stored within a local geographic shard. Region specific policies for data collection, storage, retention, and protection may be implemented on the shard. The clustering process 546, described in further detail below, can access each of the geographic shards from a central location, but does not store user data.

The documents 510 are ingested from the mailboxes into an object store 530. The object store 530 is a platform that provides key value storage, which allows quick data access based on values while enforcing access permission policies. Inside the object store 530, there is a representation of every file inside the enterprise. The representation includes the metadata for the file. The object store 530 implements access permissions to the file. The object store 530 allows retrieval of metadata for the files.

The shards 522 detect events when a new document is added or changed and calls the template matching process 540. The template matching process 540 opens each source enterprise document and compares the new document or modified parts thereof to templates 410. The template matching process 540 creates the extracts 412. The template matching process 540 sends the extracts 412 and a document ID of the corresponding source enterprise document 510 to a topic match shard 544 via a substrate bus 542. The topic match shard 544 is a specialized mailbox that stores extracts from different documents.

A clustering process 546 is performed either periodically as a time based process or incrementally as an event based process. For example, the clustering process 546 receives a batch notification from the topic match shard 544 indicating that either a new clustering should be performed or that a number of matching extracts (e.g., a batch) is ready for incremental clustering. The clustering process 546 is an unsupervised machine learning process that finds groupings or clusters within the extracts. The clustering process 546 performs multiple iterations on the extracts until a stable probability distribution is reached. The clustering process 546 collapses the multiple extracts into a single entity name. The clustering process 546 outputs the entity names and attributes associated with the entity names. The clustering process 546 can fetch metadata from object store 530 for use in the clustering and/or in creating entity records based on entity names. For example, the clustering process 546 generates entity records based on the entity names and populates the entity records using metadata associated with the enterprise source documents supporting the entity names.

A knowledge graph merge process 550 updates the knowledge graph 310 based on the output of the clustering process 546. For example, in a first implementation, the knowledge graph merge process 550 simply replaces the existing knowledge graph 310 with a new knowledge graph based on the output of the clustering process 546. Since the source documents include topic pages for previously mined entities, the new knowledge graph may also include the topic pages, which may be supplemented with additional mined related people, documents, etc. In a second implementation for incremental clustering, the knowledge graph merge process 550 merges entities from the clustering process 546 with the existing knowledge graph 310. Further details of merging entities with an existing knowledge graph are described in further detail below with respect to FIG. 11.

The object store 530 may control access to entity records in the knowledge graph 310 based on permissions of each user to view the set of enterprise source documents associated with the entity record. A topic page 342 is created from an entity record and is owned by a user that creates the topic page 342. Creating the topic page explicitly links the mined entity record to the topic page. A user can also create a topic page that will be added to the knowledge graph 310 as a new entity record based on the content supplied by the user. The topic page owner controls what is displayed on the topic page 342. The knowledge graph 310 provides suggestions for the topic page 342 based on the attributes of the entity record and linked entities.

In an implementation, multiple topic pages on the same topic may be created. For example, the clustering process 546 mines a project entity name for a confidential project based on source documents for the project. An expert associated with the project can create a first topic page that includes data from the source documents that are available to other experts associated with the project. Another user (e.g., an accountant) may have limited access to information about the project (e.g., an invoice with the project name). The accountant may create a second topic page and add information related to the project finances, which becomes available to other users with access to the invoice. Both topic pages are linked to the same project entity record in the knowledge graph 310. A search for the project returns one or both of the topic pages based on the permissions of the user performing the search. An administrator can be provided with a notification of creation of multiple topic pages for the same topic and the administrator determines whether to combine the topic pages or delete one of the topic pages.

Figure 6:
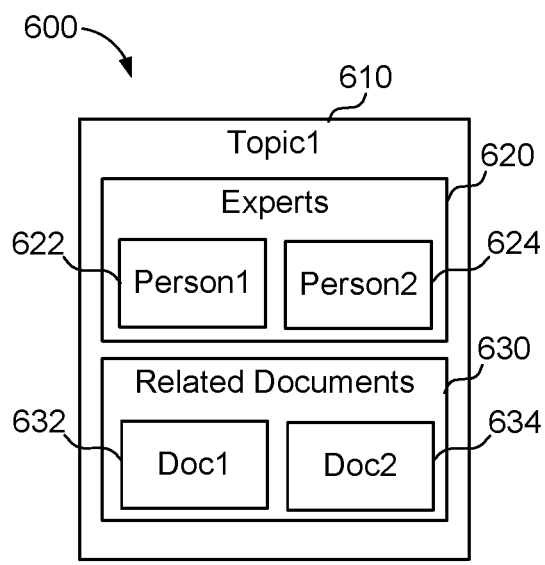
FIG. 6 is a diagram of an example topic entity record, in accordance with an implementation of the present disclosure.

Turning to FIG. 6, an example entity record 600 includes a topic name 610, an experts attribute 620 and a related documents attribute 630. The entity record 600 is a mined entity based on the topic name 610. The experts attribute 620 includes a first person 622 and a second person 624 that are associated with the topic name 610 based on the source documents. The related documents attribute 630 includes a first document 632 and a second document 634, which are the source documents associated with the mined topic name 610.

Figure 7:
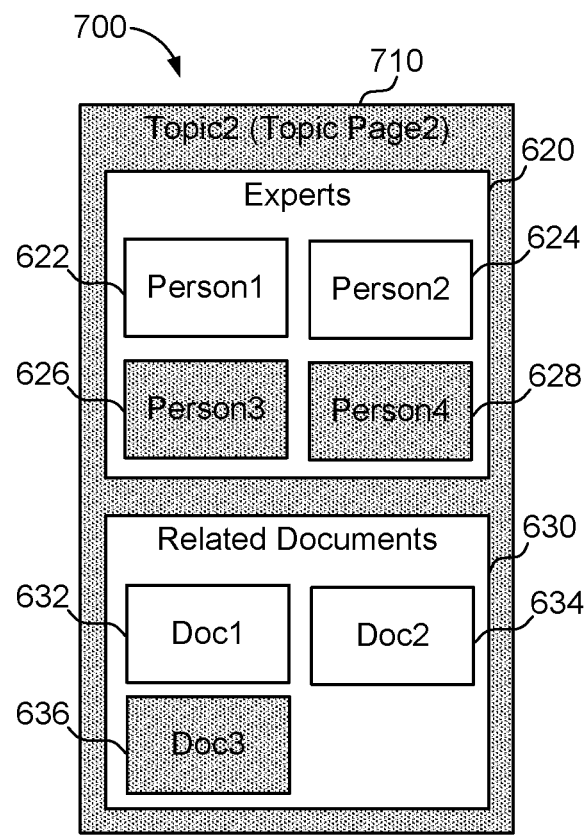
FIG. 7 is a diagram of an example topic entity record including a topic page, in accordance with an implementation of the present disclosure.

Turning to FIG. 7, another example entity record 700 includes a topic page 710. The topic page 710 shares the entity name with the entity record 700. The topic page 710 is created by a user based on the entity record 600. For example, the user has added a third person 626 and a fourth person 628 to the experts attribute 620 and added a third document 636 to the related documents attribute 630.

In an implementation, when a user views a topic page 342 or a topic card 344, content of the topic page 342 or a topic card 344 is trimmed based on permissions of the accessing user. For example, referring to the example entity record 700, the user does not have access to document 632, which was mined, but does have access to document 634 and document 636. In this case, only documents 634 and 636 will appear in the topic page 342 or topic card 344. Since the user has access to documents 634 and 636, the topic page 710 can be displayed and the references to the experts attribute 620 included. If document 632 is the only source for one of the experts (e.g., person 622), then person 622 will not be displayed in the topic page 710.

Referring again to FIG. 5, the knowledge graph API 340 receives requests from a user or an application of the user (e.g., a document viewer application) to view a topic page 342 or topic card 344, which is a subset of a topic page. The knowledge graph API 340 determines a topic key for the request, and submits the request to the object store 530, If the topic key corresponds to a topic page, the object store 530 retrieves the entity record for the topic and determines the sources for the topic page. Otherwise, the objet store returns an indication that there is no corresponding topic. The object store 530 determines the permissions to view each attribute of the topic page as discussed above and returns the source documents to which the user has access. If the user does not have access to any of the sources, the object store 530 returns the indication that there is not corresponding topic. Otherwise, the knowledge graph API 340 constructs the topic page 342 or topic card 344 for viewing based on the entity record and source documents.

In another implementation, access control list (ACL) aggregation is used to control access to topic pages. When a new document is added to a topic, the object store can retrieve the ACL for the document. If the ACL is simple, meaning the ACL does not deny any enterprise users, the ACL can be aggregated into a topic ACL. Otherwise, the ACL can be added to a complex ACL list.

When a document is changed or deleted, the object store 530 can retrieve the original ACL for the document. If there is a change from the original ACL, the object store 530 can get topics related to the document. If the ACL has changed from a complex ACL to a simple ACL or has been deleted, the ACL can be removed from the complex ACL list. If the ACL has changed from a simple ACL to a complex ACL, the ACL can be added to the complex ACL list. The object store 530 can track a access control element (ACE) count for each topic. The topic ACL can be used when the ACE count is above a threshold, and individual ACLs for each document can be used when the ACE count is below the threshold.

Figure 8:
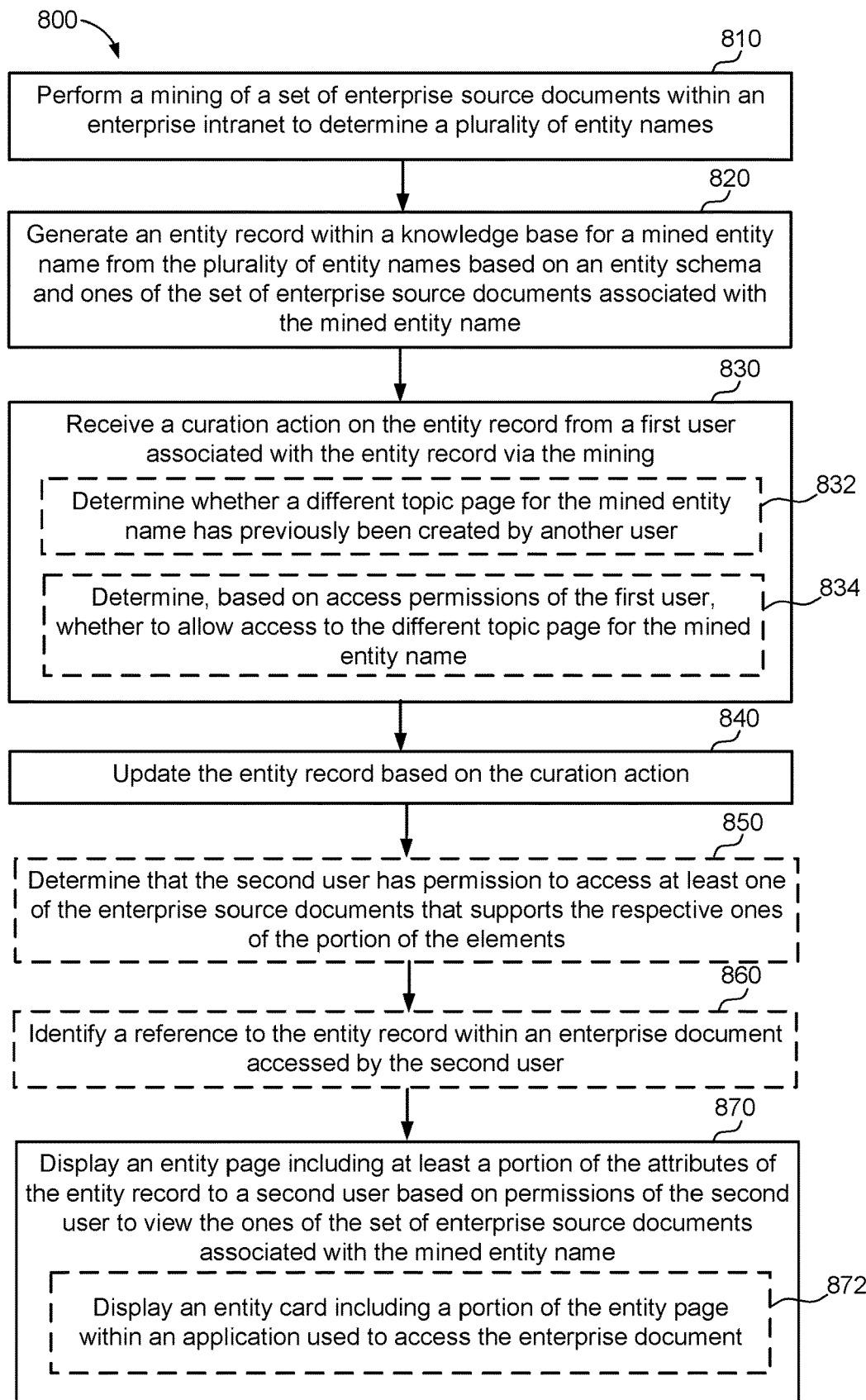
FIG. 8 is a flowchart of an example method of displaying an entity page based on an automatically generated knowledge graph, in accordance with an implementation of the present disclosure.

Turning to FIG. 8, an example method 800 displays an entity page based on an entity record within an automatically generated knowledge graph. For example, method 800 can be performed by the computer device 110, the architecture 300, or the architecture 500. Optional blocks are illustrated with dashed lines.

At block 810, the method 800 includes performing a mining of a set of enterprise source documents within an enterprise intranet to determine a plurality of entity names. In an implementation, the mining module 160 executes the name component 162 to perform the mining of the set of enterprise source documents 510 to determine the plurality of entity names. As discussed above, the mining module 160 and/or the name component 162 can execute the mining process 400 to perform the mining. Further details of block 810 are discussed below with respect to FIG. 9.

At block 820, the method 800 includes generating an entity record within a knowledge graph for a mined entity name from the plurality of entity names based on an entity schema and ones of the set of enterprise source documents associated with the mined entity name. The entity record includes attributes aggregated from the ones of the set of enterprise source documents associated with the mined entity name. In an implementation, the mining module 160 executes the aggregation component 164 to generate the entity record (e.g., project entity record 480) within the knowledge graph 310 for the mined entity name from the plurality of entity names based on the entity schema and ones of the set of enterprise source documents associated with the mined entity name.

At block 830, the method 800 includes receiving a curation action on the entity record from a first user associated with the entity record via the mining. In an implementation, the knowledge graph API 152 executes the curation component 154 to receive the curation action on the entity record from the first user associated with the entity record via the mining. For example, the first user can be the person 622 that is identified as an expert by the experts attribute 620.

For example, in some cases, the curation action is creation of a topic page 342 (e.g., the topic page 710) for the mined entity name. In sub-block 832, the block 830 optionally includes determining whether a different topic page for the mined entity name has previously been created by another user. For instance, the curation component 154 determines whether a different topic page for the mined entity name has previously been created by another user. If a different topic page for the mined entity name has previously been created by another user, in sub-block 834, the block 830 optionally includes determining, based on access permissions of the first user, whether to allow access to the different topic page for the mined entity name. For instance, the curation component 154 determines based on access permissions of the first user, whether to allow access to the different topic page for the mined entity name. For example, the permissions determine whether to first user is allowed to curate the different topic page for the mined entity name.

At block 840, the method 800 includes updating the entity record based on the curation action. In an implementation, the knowledge graph API 152 executes the curation component 154 to update the entity record based on the curation action. For example, the knowledge graph API sends the topic page changes 360 to the online document system 362, and the knowledge aggregations process 350 and/or knowledge graph merge process 550 updates the knowledge graph based on the topic page changes.

At block 850, the method 800 optionally includes determining that the second user has permission to access at least one of the enterprise source documents that support the respective ones of the portion of the attributes. In an implementation, the knowledge graph API 152 executes the display component 156 to determine that the second user has permission to access at least one of the enterprise source documents 510 that supports the respective ones of the portion of the attributes.

At block 860, the method 800 optionally includes identifying a reference to the entity record within an enterprise document accessed by the second user. In an implementation, the knowledge graph API 152 executes the display component 156 to identify the reference to the entity record within an enterprise document accessed by the second user.

At block 870, the method 800 optionally includes displaying an entity page including at least a portion of the attributes of the entity record to a second user based on permissions of the second user to view the ones of the set of enterprise source documents associated with the mined entity name. In an implementation, the knowledge graph API 152 executes the display component 156 to display an entity page including at least a portion of the attributes of the entity record to a second user based on permissions of the second user to view the ones of the set of enterprise source documents associated with the mined entity name. Displaying the entity page may be in response to block 850. In sub-block 872, the block 870 optionally includes displaying an entity card including a portion of the entity page within an application used to access the enterprise document. For instance, the sub-block 872 is optionally performed in response to the block 860. Accordingly, the entity card is displayed to the second user in association with the reference to the entity record.

Figure 9:
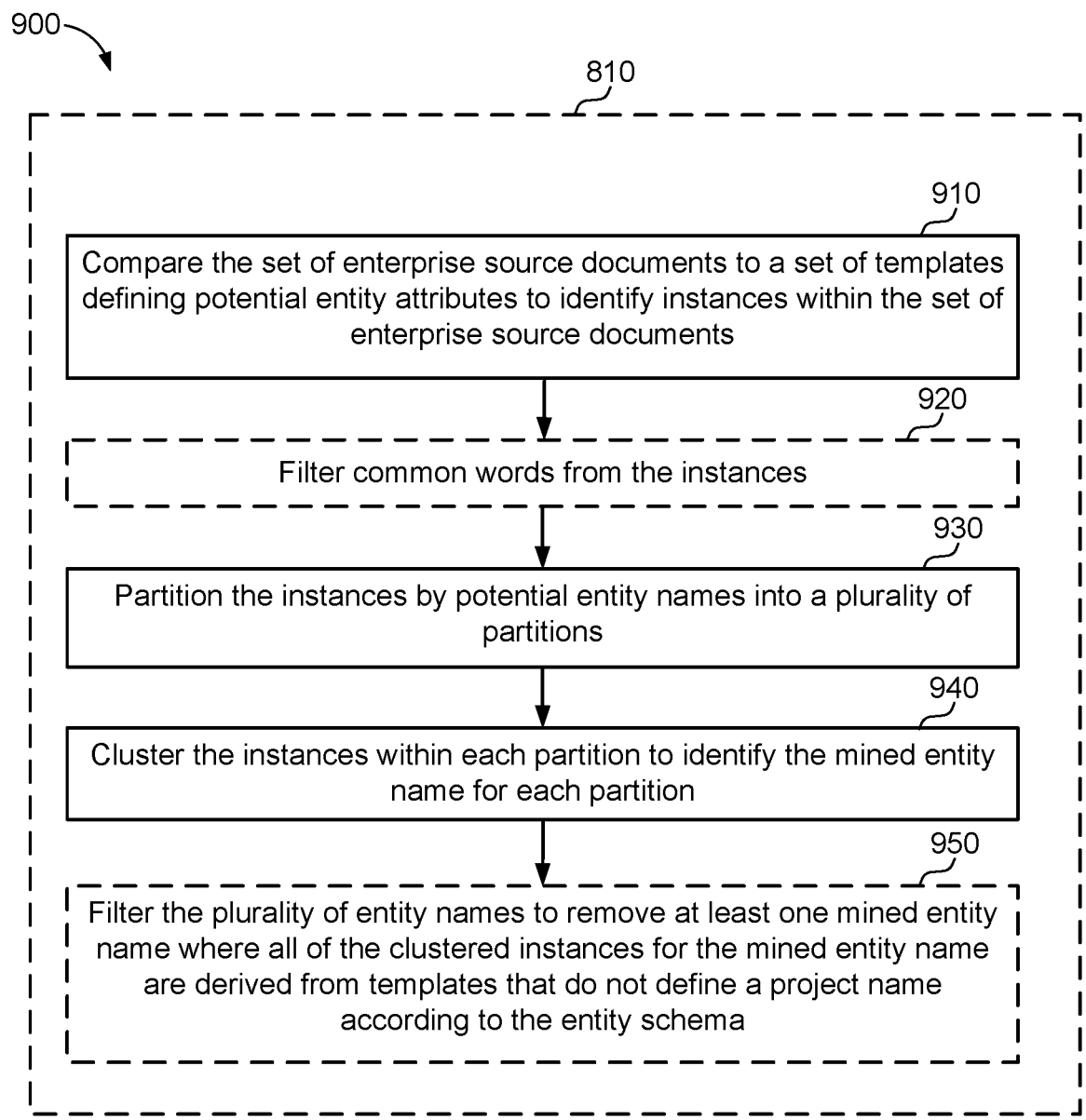
FIG. 9 is a flowchart of an example method of mining entity names from source documents, in accordance with an implementation of the present disclosure.

Turning to FIG. 9, an example method 900 performs a mining of a set of enterprise source documents within an enterprise intranet to determine a plurality of entity names. The method 900 is an example implementation of block 810 of method 800. For example, method 900 can be performed by the computer device 110, the architecture 300, or the architecture 500. Optional blocks are illustrated with dashed lines.

At block 910, the method 900 includes comparing the set of enterprise source documents to a set of templates defining potential entity attributes to identify instances within the set of enterprise source documents. In an implementation, the name component 162 executes the template instance creation process 420 to compare the set of enterprise source documents 510 to a set of templates 410 defining potential entity attributes to identify instances within the set of enterprise source documents.

At block 920, the method 900 optionally includes filtering common words from the instances. In an implementation, the name component 162 executes the pre-filtering process 430 to filter common words from the instances.

At block 930, the method 900 includes partitioning the instances by potential entity names into a plurality of partitions. In an implementation, the name component 162 executes the partitioning process 440 to partition the instances by potential entity names into a plurality of partitions.

At block 940, the method 900 includes clustering the instances within each partition to identify the mined entity name for each partition. In an implementation, the name component 162 executes the clustering process 450 to cluster the instances within each partition to identify the mined entity name for each partition At block 950, the method 900 optionally includes filtering the plurality of entity names to remove at least one mined entity name where all of the clustered instances for the mined entity name are derived from templates that do not define a project name according to the entity schema. In an implementation the name component 162 executes the post-filtering process 460 to filter the plurality of entity names to remove at least one mined entity name where all of the clustered instances for the mined entity name are derived from templates that do not define a project name according to the entity schema. In another implementation, post-filtering may be used to exclude entities that have high level of duplication, indicated by a high number of disconnected instances. For example, project funding, is a common phrase that occurs frequently on different sites. Post-filtering can catch this by eliminating entities with a degree of duplication higher than some threshold, like (e.g., 5 or more).

Figure 10:
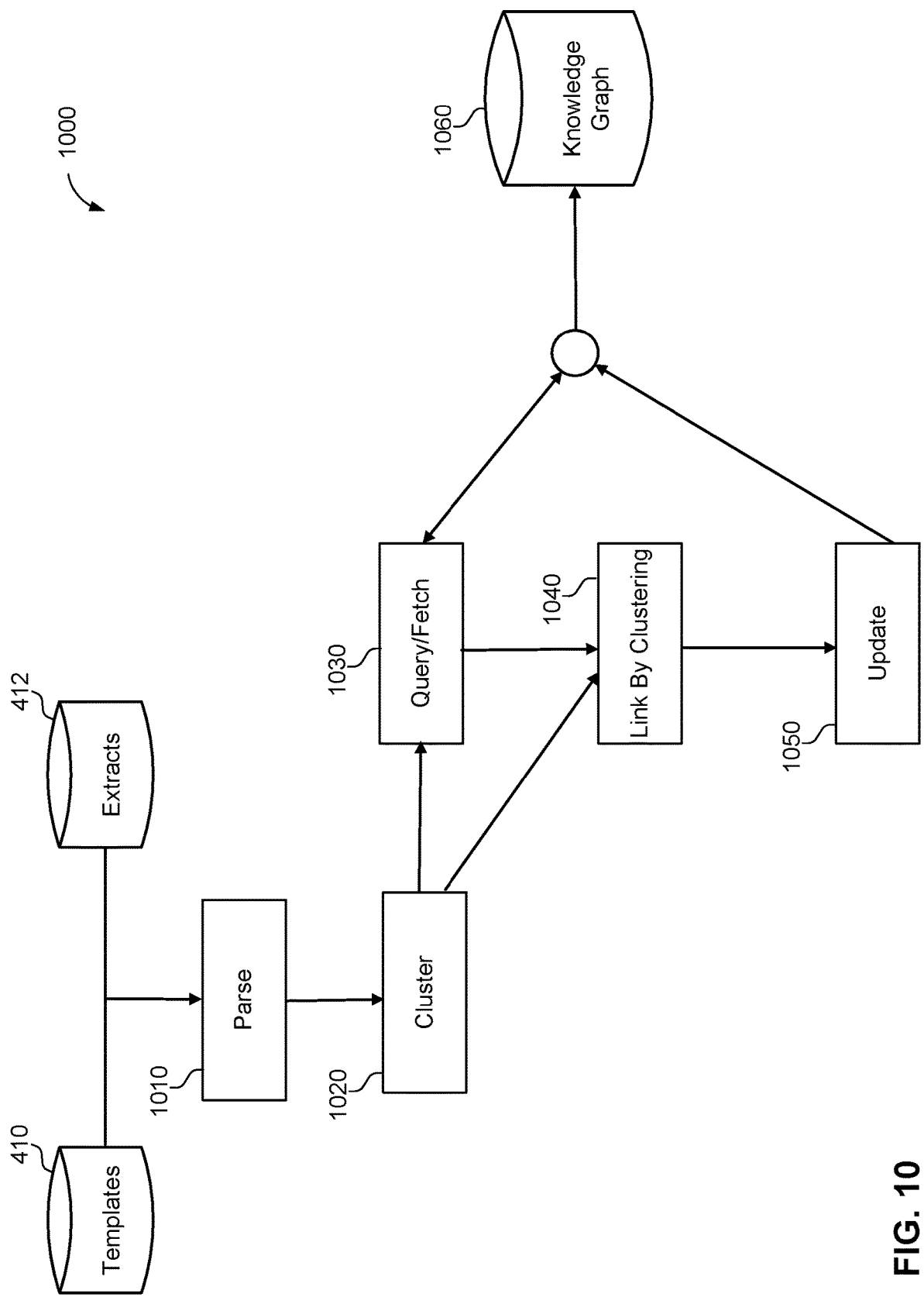
FIG. 10 is a conceptual diagram of an example incremental clustering process, in accordance with an implementation of the present disclosure, in accordance with an implementation of the present disclosure.

Turning to FIG. 10, another example mining process 1000 performs incremental clustering to update a knowledge graph 470. The mining process 1000 may be performed for a particular entity type such as a project entity type, which may be defined by a schema, to generate an entity record such as project entity record 480. Similar to the mining process 400, the mining process 1000 may be performed on template 410 and extracts 412, which may be extracted from source documents 510.

A parsing process 1010 is similar to the template instance creation process 420. For example, the template matching process 540 evaluates the templates 410 and the extracts 412 to determine an uncertainty regarding an entity name (e.g., a project name) associated with the extract. The parsing process 1010 captures the uncertainty around the template match as a string distribution (e.g., alternative strings each associated with a probability). The parsing process 1010 generates a limited number of instances. In an implementation, the parsing process 1010 generates instances until the limited number of instances is reached, at which point the parsing process 1010 triggers a clustering process 1020.

The clustering process 1020 is similar to the clustering process 450, except that the clustering process 1020 operates on the limited number of instances as a batch, instead of on all extracted instances. The number of operations and memory required for the clustering process 1020 is on the order of $N^2$, where N is proportional to the number of instances. An enterprise intranet may include thousands or possibly millions of source documents, each having hundreds or possibly thousands of extracts. Accordingly, the clustering process 1020 may become infeasible given limited computing resources and a large number of source documents. Performing the clustering process 1020 incrementally on the limited number of instances can reduce the use of computing resources. The limited number of instances can be configured to improve feasibility and/or speed of the clustering process. For example, the number of the instances can be based on an amount of the memory required to store the number of the instances and associated clustering metadata. Performing the clustering process 1020 on the number of the instances and performing the clustering on a second set of the number of the instances uses less memory than performing the clustering on a set of instances including twice the number of the instances due to the $N^2$ complexity. The clustering process 1020, however, may not produce complete information about entities because information from some of the instances (e.g., instances greater than the limited number) is not included in the batch. Accordingly, the clustering process 1020 outputs potential entity names, which are considered statistically formative entities. A statistically formative entity is associated with a greater level of uncertainty than an established entity.

The mining process 1000 includes a query/fetch process 1030 for retrieving a set of candidate entity records that might be related to the potential entity names. That is, the knowledge graph 1060 already includes the candidate entity records and the potential entity names may match one of the candidate entity records and include additional information about the entity that should be included in the entity record. Querying the knowledge graph 1060 based on a potential entity name is complicated by uncertainty associated with a potential entity name. As discussed above, a potential entity name is represented by a probability distribution over multiple strings. In an implementation, the query/fetch process queries the knowledge graph 1060 using each of the multiple strings in the probability distribution for each potential entity name. The query returns a set of candidate entity records that at least partially match each potential entity name. That is each candidate entity record includes an entity name that at least partially matches (e.g., includes a subset of a queried string) one or more of the potential entity names.

A link by clustering process 1040 is similar to the clustering process 1020, except the link by clustering process 1040 operates on the potential entity names and the set of candidate entity records. As discussed above, the entity records include attributes and attribute values. In order to perform the link by clustering process 1040 based on uncertainty, an uncertainty associated with each entity record is regenerated based on the source documents. That is, the link by clustering process 1040 determines a probability distribution for the entity name of the entity record based on source documents linked to the entity record. For instance, in an implementation, the link by clustering process 1040 performs the mining process 400 on the source documents linked to the entity record. In an implementation, an established entity record is associated with a probability distribution over a single string (e.g., a probability of 1 or a level of uncertainty of 0). The link by clustering process 1040 performs iterations of unsupervised learning on the potential entity names and candidate entity records to arrive at a new stable probability distributions. Linking involves combining evidence. For example, the new batch of potential entities may bring more evidence for a particular entity name to be a project. The probability distribution for the entity may then exceed a threshold and the new entity can become established. Linking also involves potential matches on the metadata between source documents for a given entity. So, if documents associated with an entity all belong to the same site, or a common set of people contributed to them, or the set of people belong to common groups/distribution lists, the probability of the entity name may be greater. As discussed in further detail below with respect to FIG. 11, the link by clustering process 1040 results in a merged entity record, an updated entity record, a new entity record, or no change.

An update process 1050 stores the merged entity records, updated entity records, or new entity records in the knowledge graph 1060. In an implementation, the update process 1050 includes determining a status of each of the updated matching candidate entity records and each of the new entity records as one of established or formative based on a level of uncertainty for a respective entity record. The status is stored with the entity record (e.g., as metadata) and can be used in the link by clustering process 1040 when the entity record is a candidate entity record.

Figure 11:
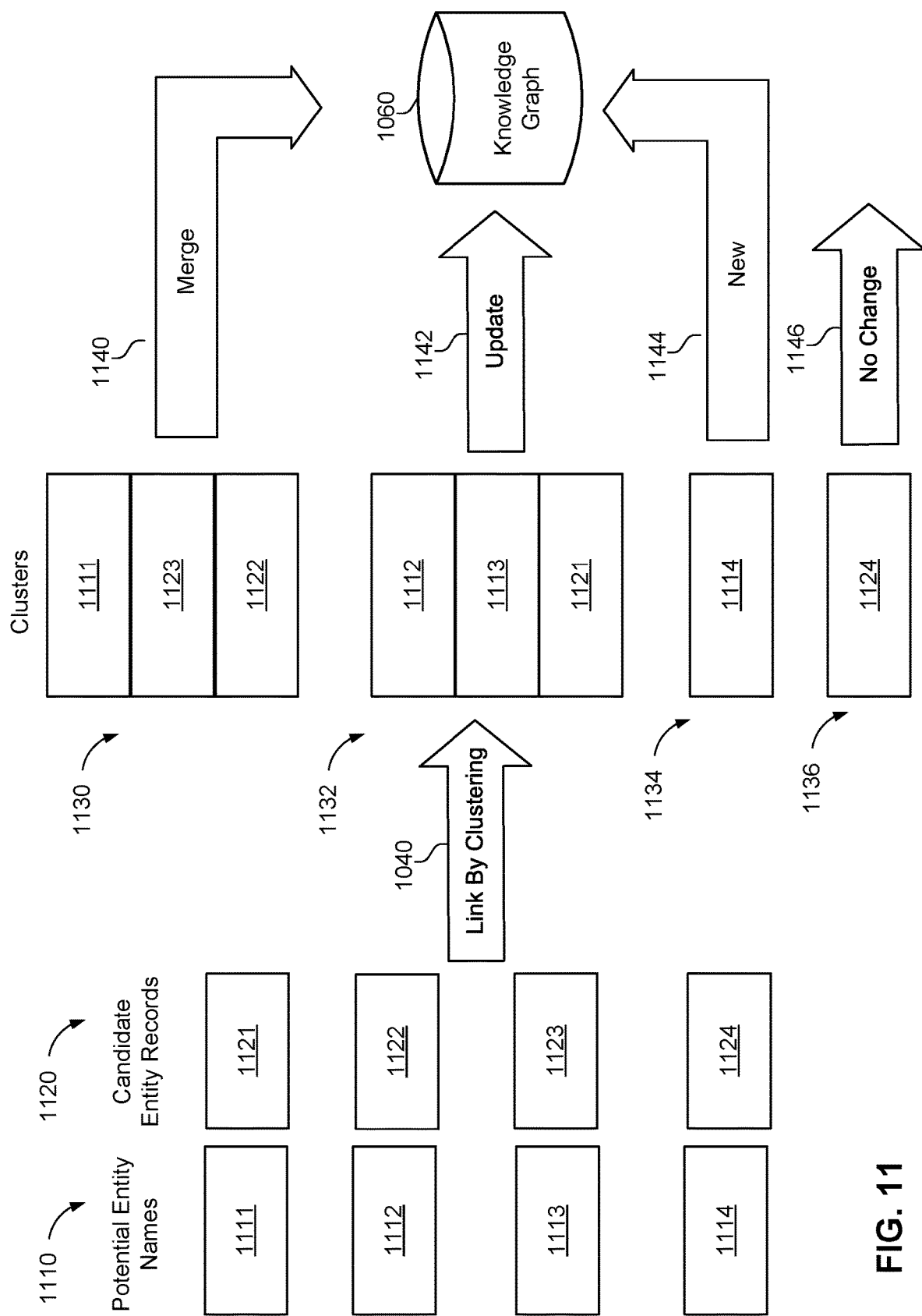
FIG. 11 is a conceptual diagram of an example of clustering potential entity names and candidate entity records to update a knowledge graph.

Referring now to FIG. 11, an example of link by clustering process 1040 operates on a set of potential entity names 1110 and a set of candidate entity records 1120 to produce clusters 1130, 1132, 1134, and 1136. The link by clustering process 1040 performs one of a merge operation 1140, update operation 1142, new entity operation 1144, or no change operation 1146 on each cluster.

For instance, a first cluster 1130 includes a potential entity name 1111 and candidate entity records 1122 and 1123. The candidate entity records 1122 and 1123 are the result of a previous clustering process 1020 and may include similar names, but the previous clustering process 1020 determined that the candidate entity records 1122 and 1123 are unique entities based on the probability distributions. When the link by clustering process 1040 considers the potential entity name 1111, however, the potential entity name 1111 includes information related to both candidate entity record 1122 and 1123 such that the clustering operation determines that there is a single entity. Accordingly, the link by clustering process 1040 performs the merge operation 1140 to update at least one of the candidate entity records 1122 and 1123, or create a new entity record. For example, the merge operation 1140 can update the candidate entity record 1122 to include information from the candidate entity record 1123 and the potential entity name 1111 and delete the candidate entity record 1123 to create a single entity record for the cluster 1130. Alternatively, the link by clustering process 1040 can generate a new entity record based on potential entity name 1111, copy information from the candidate entity records 1122 and 1123 into the new entity record, and delete the candidate entity records 1122 and 1123.

The second cluster 1132 includes the potential entity names 1112 and 1113, and the candidate entity record 1121. That is, the link by clustering process 1040 determines that the potential entity names 1112 and 1113 refer to the existing candidate entity record 1121. Accordingly, the link by clustering process 1040 performs an update operation 1142 to update the candidate entity record 1121 with information from the potential entity names 1112 and 1113.

The third cluster 1134 includes a single potential entity name 1114. Accordingly, the clustering process 1040 determines that the single potential entity name 1114 is a new entity (e.g., an entity first discussed in a new source document) and performs the new entity operation 1144 to create a new entity record.

The fourth cluster 1136 includes a single candidate entity record. That is, the clustering process 1040 determines that although the candidate entity record 1124 was returned by a query for a potential entity name, the candidate entity record 1124 is actually distinct from any of the potential entity names. Accordingly, the link by clustering process 1040 may perform a no change operation 1146, which may include deleting the cluster 1136 without updating the knowledge graph 1060 because there are no changes to the entity record 1124.

Figure 12:
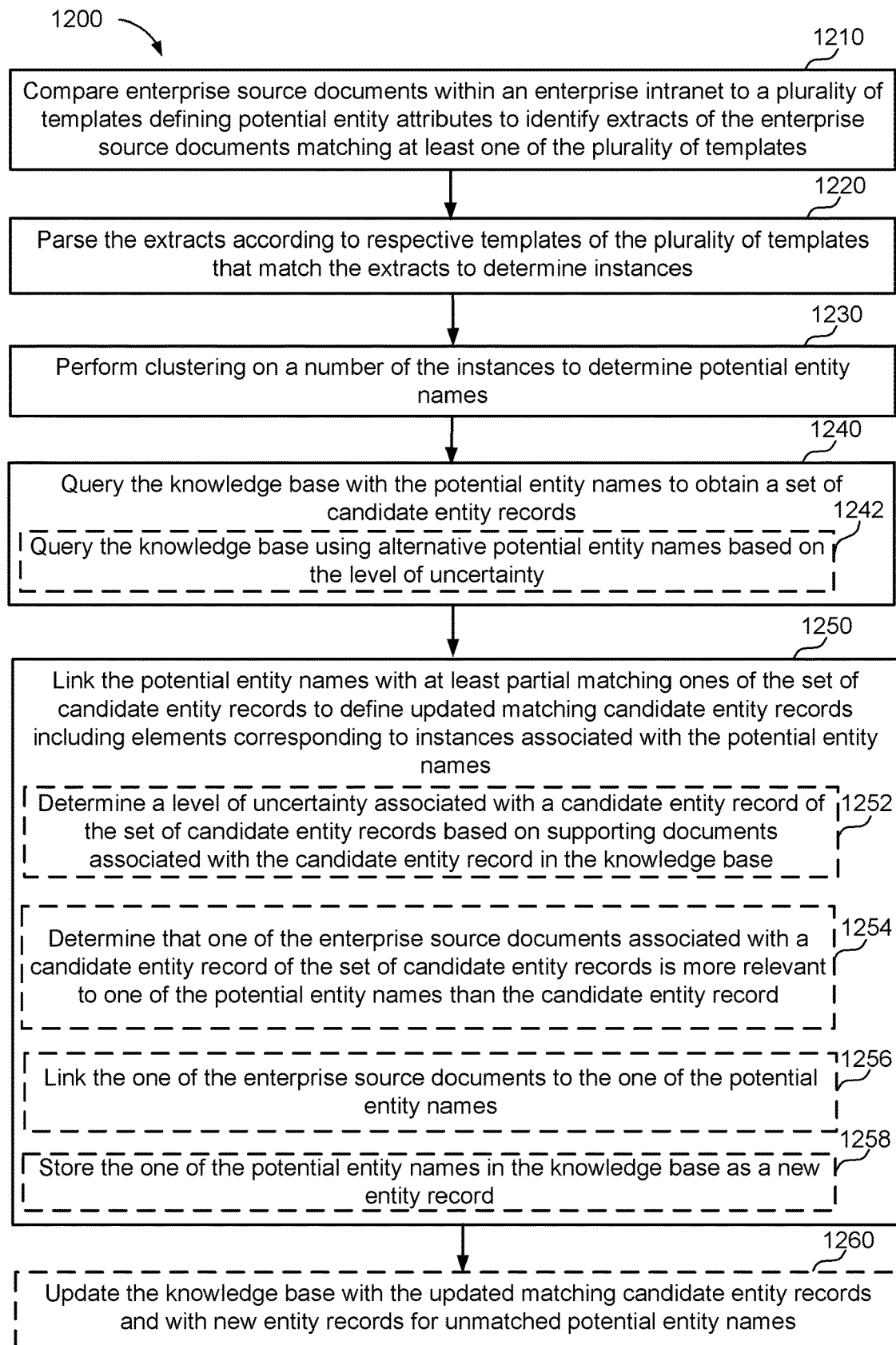
FIG. 12 is a flowchart of an example method of mining entity names from source documents using incremental clustering, in accordance with an implementation of the present disclosure.

Turning to FIG. 12, an example method 1200 performs incremental mining on extracts from source documents to update a knowledge graph. For example, method 1200 can be performed by the computer device 110, the architecture 300, or the architecture 500. Optional blocks are illustrated with dashed lines.

At block 1210, the method 1200 includes comparing enterprise source documents within an enterprise intranet to a plurality of templates defining potential entity attributes to identify extracts of the enterprise source documents matching at least one of the plurality of templates. In an implementation, the search crawler 514 compares the enterprise source documents 510 stored in the online document storage 512 to the templates 410 to identify extracts 412 of the enterprise source documents 510 matching at least one of the plurality of templates 410. The search crawler 514 stores the extracts in a primary shard 522 associated with a mailbox 520.

At block 1220, the method 1200 includes parsing the extracts according to respective templates of the plurality of templates that match the extracts to determine instances. In an implementation, the template matching process 540 parses the extracts 412 according to respective templates 410 of the plurality of templates that match the extracts to determine instances. Accordingly, block 1220 may execute the template instance creation process 420 described above with respect to FIG. 4. The template matching process 540 stores the instances in the topic match shard 544 via the substrate bus 542.

At block 1230, the method 1200 includes performing clustering on a number of the instances to determine potential entity names. In an implementation, the clustering process 546 receives a batch notification when the topic match shard 544 is storing the number of the instances. The clustering process 546 fetches the number of instances from the topic match shard and performs clustering on the number of instances to determine potential entity names. Accordingly, the block 1230 may execute the clustering process 450 described above with respect to FIG. 4. In an implementation, the block 1230 may optionally include one or more of the pre-filtering process 430, portioning process 440, and post filtering process 460 described above.

At block 1240, the method 1200 includes querying the knowledge graph with the potential entity names to obtain a set of candidate entity records. In an implementation, the knowledge graph merge process 550 queries the knowledge graph 310 with the potential entity names to obtain a set of candidate entity records 1120. Optionally, at sub-block 1242, the block 1240 includes querying the knowledge graph using alternative potential entity names based on the level of uncertainty. The level of uncertainty is assigned to an attribute associated with a potential entity name during the clustering in block 1230. Accordingly, the sub-block 1242 includes performing the query/fetch process 1030 using alternative potential entity names (e.g., the multiple strings in a probability distribution).

At block 1250, the method 1200 includes linking the potential entity names with at least partial matching ones of the set of candidate entity records to define updated matching candidate entity records including attributes corresponding to instances associated with the potential entity names. In an implementation, the knowledge graph merge process 550 links the potential entity names with at least partial matching ones of the set of candidate entity records to define updated matching candidate entity records including attributes corresponding to instances associated with the potential entity names. For instance, the knowledge graph merge process 550 performs clustering on the potential entity names and the set of candidate entity records.

In sub-block 1252, the block 1250 optionally includes determining a level of uncertainty associated with a candidate entity record of the set of candidate entity records based on supporting documents associated with the candidate entity record in the knowledge graph. For instance, the knowledge graph merge process 550 and/or the link by clustering process 1040 determines the level of uncertainty (e.g., a probability distribution) associated with a candidate entity record 1120 in the knowledge graph 1060.

In sub-block 1254, the block 1250 optionally includes determining that one of the enterprise source documents associated with a candidate entity record in the set of candidate entity records is more relevant to one of the potential entity names than the candidate entity record. For example, as illustrated in FIG. 11, the candidate entity record 1123 is clustered with the potential entity name 1111 and the candidate entity record 1122 because one of the enterprise source documents associated with the candidate entity record 1123 is more relevant to the potential entity name 1111 than the candidate entity record 1123. In sub-block 1256, the block 1250 optionally includes linking the one of the enterprise source documents to the one of the potential entity names. For example, the merge operation 1140 links the source document to the potential entity name 1111 (e.g., by copying a related documents attribute 630). In sub-block 1258, the block 1250 optionally includes storing the one of the potential entity names in the knowledge graph as a new entity record. For example, the merge operation 1140 stores a new entity record based on the potential entity name 1111 and the candidate entity records 1122 and 1123.

At block 1260, the method 1200 includes updating the knowledge graph with the updated matching candidate entity records and with new entity records for unmatched potential entity names, wherein the unmatched potential entity names are defined by ones of the potential entity names that do not match with any of the set of candidate entity records. In an implementation, the knowledge graph merge process 550 updates the knowledge graph 310 with the updated matching candidate entity records (e.g., from merge operation 1140 and update operation 1142) and with new entity records for unmatched potential entity names (e.g., from new entity operation 1144). The unmatched potential entity names are defined by the potential entity names 1110 (e.g., entity name 1114) that do not match with any of the set of candidate entity records.

Figure 13:
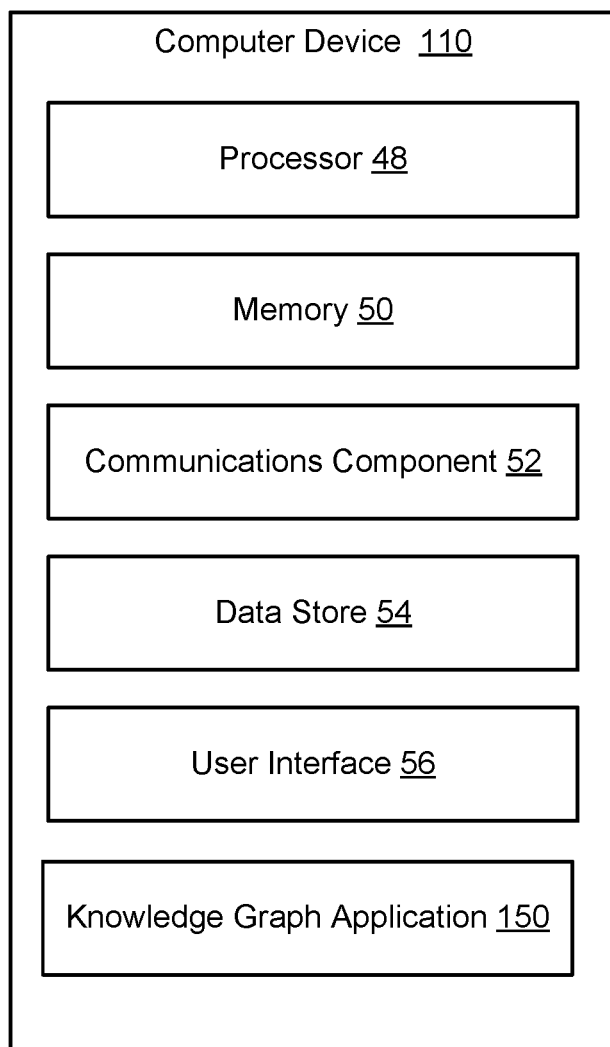
FIG. 13 is a schematic block diagram of an example computer device, in accordance with an implementation of the present disclosure.

Referring now to FIG. 13, illustrated is an example computer device 110 in accordance with an implementation, including additional component details as compared to FIG. 1. In one example, computer device 110 includes processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 includes the CPU 114.

In an example computer device 110 includes memory 50 for storing instructions executable by the processor 48 for carrying out the functions described herein. In an implementation, for example, memory 50 includes memory 116. The memory 50 includes instructions for executing the knowledge graph application 150.

Further, computer device 110 includes a communications component 52 that provides for establishing and maintaining communications with one or more parties utilizing hardware, software, and services as described herein. Communications component 52 carries communications between components on computer device 110, as well as between computer device 110 and external devices, such as devices located across a communications network and/or devices serially or locally connected to computer device 110. For example, communications component 52 includes one or more buses, and may further include transmit chain components and receive chain components associated with a transmitter and receiver, respectively, operable for interfacing with external devices.

Additionally, computer device 110 includes a data store 54, which can be any suitable combination of hardware and/or software, that provides for mass storage of information, databases, and programs employed in connection with implementations described herein. For example, data store 54 can be a data repository for the knowledge graph application (e.g., for storing the knowledge graph 310). The data store 54 includes memory 116 and/or a storage device 118.

Computer device 110 can also include a user interface component 56 operable to receive inputs from a user of computer device 110 and further operable to generate outputs for presentation to the user. User interface component 56 includes one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 includes one or more output devices, including but not limited to a display, a speaker, a haptic feedback mechanism, a printer, any other mechanism capable of presenting an output to a user, or any combination thereof.

In an implementation, user interface component 56 transmits and/or receives messages corresponding to the operation of knowledge graph application 150. In addition, processor 48 executes knowledge graph application 150, and memory 50 or data store 54 stores knowledge graph application 150.

As used in this application, the terms "component," "system" and the like are intended to include a computer-related entity, such as but not limited to hardware, firmware, a combination of hardware and software, software, or software in execution. For example, a component includes, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features have been presented in terms of systems that include a number of devices, components, modules, and the like. A person skilled in the art should understand and appreciate that the various systems can include additional devices, components, modules, etc. and/or may not include all of the devices, components, modules etc. discussed in connection with the figures. A combination of these approaches can also be used.

The various illustrative logics, logical blocks, and actions of methods described in connection with the embodiments disclosed herein can be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor includes a microprocessor, but, in the alternative, the processor can be any conventional processor, controller, microcontroller, or state machine. A processor can also be implemented as a combination of computer devices, e.g., a combination of a DSP and a microprocessor, a plurality of microprocessors, one or more microprocessors in conjunction with a DSP core, or any other such configuration. Additionally, at least one processor can comprise one or more components operable to perform one or more of the steps and/or actions described above.

Further, the steps and/or actions of a method or procedure described in connection with the implementations disclosed herein can be embodied directly in hardware, in a software module executed by a processor, or in a combination of the two. A software module resides in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium can be integral to the processor. Further, in some implementations, the processor and the storage medium reside in an ASIC. Additionally, the ASIC can reside in a user terminal. In the alternative, the processor and the storage medium can reside as discrete components in a user terminal. Additionally, in some implementations, the steps and/or actions of a method or procedure may reside as one or any combination or set of codes and/or instructions on a machine readable medium and/or computer readable medium, which can be incorporated into a computer program product.

In one or more implementations, the functions described can be implemented in hardware, software, firmware, or any combination thereof. If implemented in software, the functions are stored or transmitted as one or more instructions or code on a computer-readable medium. Computer-readable media includes both computer storage media and communication media including any medium that facilitates transfer of a computer program from one place to another. A storage medium can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above can be made without departing from the scope hereof. Other implementations will be apparent to those skilled in the art from a consideration of the specification or from a practice in accordance with examples disclosed herein.

Some Further Example Implementations

An example computer system comprising: a knowledge graph storing a plurality of entities associated with an enterprise; a memory storing computer-executable instructions; a processor configured to execute the instructions to: compare enterprise source documents within an enterprise intranet to a plurality of templates defining potential entity attributes to identify extracts of the enterprise source documents matching at least one of the plurality of templates; parse the extracts according to respective templates of the plurality of templates that match the extracts to determine instances; perform clustering on a number of the instances to determine potential entity names; query the knowledge graph with the potential entity names to obtain a set of candidate entity records; link the potential entity names with at least partial matching ones of the set of candidate entity records to define updated matching candidate entity records including attributes corresponding to instances associated with the potential entity names; and update the knowledge graph with the updated matching candidate entity records and with new entity records for unmatched potential entity names, wherein the unmatched potential entity names are defined by ones of the potential entity names that do not match with any of the set of candidate entity records.

The above example computer system, wherein the number of the instances is based on an amount of the memory required to store the number of the instances and associated clustering metadata, and wherein performing the clustering on the number of the instances and performing the clustering on a second set of the number of the instances uses less memory than performing the clustering on a set of instances including twice the number of the instances.

Any of the above example computer systems, wherein the processor is configured to: determine that one of the enterprise source documents associated with a candidate entity record of the set of candidate entity records is more relevant to one of the potential entity names than the candidate entity record; link the one of the enterprise source documents to the one of the potential entity names; and store the one of the potential entity names in the knowledge graph as a new entity record.

Any of the above example computer systems, wherein a level of uncertainty is associated with a potential entity name, wherein the processor is configured to query the knowledge graph using alternative potential entity names based on the level of uncertainty.

Any of the above example computer systems, wherein the processor is configured to determine a level of uncertainty associated with a candidate entity record of the set of candidate entity records based on supporting documents associated with the candidate entity record in the knowledge graph.

Any of the above example computer systems, wherein the processor is configured to link one or more of the potential entity names with the candidate entity record based on the one or more of the potential entity names partially matching the candidate entity record according to the level of uncertainty of the candidate entity record.

Any of the above example computer systems, wherein the processor is configured to determine a status of each of the updated matching candidate entity records and each of the new entity records as one of established or formative based on a level of uncertainty for a respective entity record.

Any of the above example computer systems, wherein the processor is configured to display at least a portion of an entity page including a plurality of attributes of an entity record in the knowledge graph to a user based on permissions of the user to view the enterprise source documents associated with the entity record.

An example method of incrementally building a knowledge graph storing a plurality of entities associated with an enterprise, comprising: comparing enterprise source documents within an enterprise intranet to a plurality of templates defining potential entity attributes to identify extracts of the enterprise source documents matching at least one of the plurality of templates; parsing the extracts according to respective templates of the plurality of templates that match the extracts to determine instances; performing clustering on a number of the instances to determine potential entity names; querying the knowledge graph with the potential entity names to obtain a set of candidate entity records; linking the potential entity names with at least partial matching ones of the set of candidate entity records to define updated matching candidate entity records including attributes corresponding to instances associated with the potential entity names; and updating the knowledge graph with the updated matching candidate entity records and with new entity records for unmatched potential entity names, wherein the unmatched potential entity names are defined by ones of the potential entity names that do not match with any of the set of candidate entity records.

The above example method, wherein the number of the instances is based on an amount of computer memory required to store the number of the instances and associated clustering metadata, and wherein performing the clustering on the number of the instances and performing the clustering on a second set of the number of the instances uses less memory than performing the clustering on a set of instances including twice the number of the instances.

Any of the above example methods, wherein linking the potential entity names with at least partial matching ones of the set of candidate entity records to define updated matching candidate entity records comprises: determining that one of the enterprise source documents associated with a candidate entity record of the set of candidate entity records is more relevant to one of the potential entity names than the candidate entity record; linking the one of the enterprise source documents to the one of the potential entity names; and storing the one of the potential entity names in the knowledge graph as a new entity record.

Any of the above example methods, wherein a level of uncertainty is associated with each attribute associated with a potential entity name, wherein querying the knowledge graph comprises querying the knowledge graph using alternative potential entity names based on the level of uncertainty.

Any of the above example methods, further comprising determining a level of uncertainty associated with a candidate entity record of the set of candidate entity records based on supporting documents associated with the candidate entity record in the knowledge graph, wherein linking the potential entity names with at least partial matching ones of the set of candidate entity records comprises linking one or more of the potential entity names with the candidate entity record based on the one or more of the potential entity names partially matching the candidate entity record according to the level of uncertainty of the candidate entity record.

Any of the above example methods, further comprising displaying at least a portion of an entity page including a plurality of attributes of an entity record in the knowledge graph to a user based on permissions of the user to view the enterprise source documents associated with the entity record.

An example non-transitory computer-readable medium storing computer-executable instructions that when executed by a computer processor cause the computer processor to: compare enterprise source documents within an enterprise intranet to a plurality of templates defining potential entity attributes to identify extracts of the enterprise source documents matching at least one of the plurality of templates; parse the extracts according to respective templates of the plurality of templates that match the extracts to determine instances; perform clustering on a number of the instances to determine potential entity names; query the knowledge graph with the potential entity names to obtain a set of candidate entity records; link the potential entity names with at least partial matching ones of the set of candidate entity records to define updated matching candidate entity records including attributes corresponding to instances associated with the potential entity names; and update the knowledge graph with the updated matching candidate entity records and with new entity records for unmatched potential entity names, wherein the unmatched potential entity names are defined by ones of the potential entity names that do not match with any of the set of candidate entity records.

The above example non-transitory computer-readable medium, wherein the number of the instances is based on an amount of computer memory required to store the number of the instances and associated clustering metadata, and wherein performing the clustering on the number of the instances and performing the clustering on a second set of the number of the instances uses less memory than performing the clustering on a set of instances including twice the number of the instances.

Any of the above example non-transitory computer-readable mediums, wherein the instructions to link the potential entity names with at least partial matching ones of the set of candidate entity records to define updated matching candidate entity records comprise instructions to: determine that one of the enterprise source documents associated with a candidate entity record of the set of candidate entity records is more relevant to one of the potential entity names than the candidate entity record; link the one of the enterprise source documents to the one of the potential entity names; and store the one of the potential entity names in the knowledge graph as a new entity record.

Any of the above example non-transitory computer-readable mediums, wherein a level of uncertainty is associated with each attribute associated with a potential entity name, wherein the instructions to query the knowledge graph comprises instructions to query the knowledge graph using alternative potential entity names based on the level of uncertainty.

Any of the above example non-transitory computer-readable mediums, further comprising instructions to determine a level of uncertainty associated with a candidate entity record of the set of candidate entity records based on supporting documents associated with the candidate entity record in the knowledge graph, wherein linking the potential entity names with at least partial matching ones of the set of candidate entity records comprises linking one or more of the potential entity names with the candidate entity record based on the one or more of the potential entity names partially matching the candidate entity record according to the level of uncertainty of the candidate entity record.

Any of the above example non-transitory computer-readable mediums, further comprising instructions to display at least a portion of an entity page including a plurality of attributes of an entity record in the knowledge graph to a user based on permissions of the user to view the enterprise source documents associated with the entity record.

What is claimed is:

1. A computer system, comprising:
a knowledge graph storing a plurality of entities associated with an enterprise;
a memory storing computer-executable instructions; and
a processor configured to execute the instructions to:
compare enterprise source documents within an enterprise intranet to a plurality of templates defining potential entity attributes to identify extracts of the enterprise source documents matching at least one of the plurality of templates;
parse the extracts according to respective templates of the plurality of templates that match the extracts to determine instances;
perform incremental clustering on a number of the instances to determine potential entity names, wherein the number of the instances is based on an amount of the memory required to store the number of the instances and associated clustering metadata, and wherein performing the incremental clustering includes performing clustering on the number of the instances and performing clustering on a second set of the number of the instances, and wherein the incremental clustering uses less memory than performing the clustering on a set of instances including twice the number of the instances;
query the knowledge graph with the potential entity names to obtain a set of candidate entity records;
link the potential entity names with at least partial matching ones of the set of candidate entity records to define updated matching candidate entity records including attributes corresponding to instances associated with the potential entity names; and
update the knowledge graph with the updated matching candidate entity records and with new entity records for unmatched potential entity names, wherein the unmatched potential entity names are defined by ones of the potential entity names that do not match with any of the set of candidate entity records.

2. The computer system of claim 1, wherein the processor is configured to:
determine that one of the enterprise source documents associated with a candidate entity record of the set of candidate entity records is more relevant to one of the potential entity names than the candidate entity record;
link the one of the enterprise source documents to the one of the potential entity names; and
store the one of the potential entity names in the knowledge graph as a new entity record.

3. The computer system of claim 1, wherein a level of uncertainty is associated with a potential entity name, wherein the processor is configured to query the knowledge graph using alternative potential entity names based on the level of uncertainty.

4. The computer system of claim 1, wherein the processor is configured to determine a level of uncertainty associated with a candidate entity record of the set of candidate entity records based on supporting documents associated with the candidate entity record in the knowledge graph.

5. The computer system of claim 4, wherein the processor is configured to link one or more of the potential entity names with the candidate entity record based on the one or more of the potential entity names partially matching the candidate entity record according to the level of uncertainty of the candidate entity record.

6. The computer system of claim 1, wherein the processor is configured to determine a status of each of the updated matching candidate entity records and each of the new entity records as one of established or formative based on a level of uncertainty for a respective entity record.

7. The computer system of claim 1, wherein the processor is configured to display at least a portion of an entity page including a plurality of attributes of an entity record in the knowledge graph to a user based on permissions of the user to view the enterprise source documents associated with the entity record.

8. A method of incrementally building a knowledge graph storing a plurality of entities associated with an enterprise, comprising:
   comparing enterprise source documents within an enterprise intranet to a plurality of templates defining potential entity attributes to identify extracts of the enterprise source documents matching at least one of the plurality of templates;
   parsing the extracts according to respective templates of the plurality of templates that match the extracts to determine instances;
   performing incremental clustering on a number of the instances to determine potential entity names, wherein the number of the instances is based on an amount of computer memory required to store the number of the instances and associated clustering metadata, and wherein performing the incremental clustering includes performing clustering on the number of the instances and performing clustering on a second set of the number of the instances, and wherein the incremental clustering uses less memory than performing the clustering on a set of instances including twice the number of the instances;
   querying the knowledge graph with the potential entity names to obtain a set of candidate entity records;
   linking the potential entity names with at least partial matching ones of the set of candidate entity records to define updated matching candidate entity records including attributes corresponding to instances associated with the potential entity names; and
   updating the knowledge graph with the updated matching candidate entity records and with new entity records for unmatched potential entity names, wherein the unmatched potential entity names are defined by ones of the potential entity names that do not match with any of the set of candidate entity records.

9. The method of claim 8, wherein linking the potential entity names with at least partial matching ones of the set of candidate entity records to define updated matching candidate entity records comprises:
   determining that one of the enterprise source documents associated with a candidate entity record of the set of candidate entity records is more relevant to one of the potential entity names than the candidate entity record;
   linking the one of the enterprise source documents to the one of the potential entity names; and
   storing the one of the potential entity names in the knowledge graph as a new entity record.

10. The method of claim 8, wherein a level of uncertainty is associated with each attribute associated with a potential entity name, wherein querying the knowledge graph comprises querying the knowledge graph using alternative potential entity names based on the level of uncertainty.

11. The method of claim 8, further comprising determining a level of uncertainty associated with a candidate entity record of the set of candidate entity records based on supporting documents associated with the candidate entity record in the knowledge graph, wherein linking the potential entity names with at least partial matching ones of the set of candidate entity records comprises linking one or more of the potential entity names with the candidate entity record based on the one or more of the potential entity names partially matching the candidate entity record according to the level of uncertainty of the candidate entity record.

12. The method of claim 8, further comprising displaying at least a portion of an entity page including a plurality of attributes of an entity record in the knowledge graph to a user based on permissions of the user to view the enterprise source documents associated with the entity record.

13. A non-transitory computer-readable medium storing computer-executable instructions for incrementally building a knowledge graph storing a plurality of entities associated with an enterprise, that when executed by a computer processor cause the computer processor to:
   compare enterprise source documents within an enterprise intranet to a plurality of templates defining potential entity attributes to identify extracts of the enterprise source documents matching at least one of the plurality of templates;
   parse the extracts according to respective templates of the plurality of templates that match the extracts to determine instances;
   perform incremental clustering on a number of the instances to determine potential entity names, wherein the number of the instances is based on an amount of computer memory required to store the number of the instances and associated clustering metadata, and wherein performing the incremental clustering includes performing clustering on the number of the instances and performing clustering on a second set of the number of the instances, and wherein the incremental clustering uses less memory than performing the clustering on a set of instances including twice the number of the instances;
   query the knowledge graph with the potential entity names to obtain a set of candidate entity records;
   link the potential entity names with at least partial matching ones of the set of candidate entity records to define updated matching candidate entity records including attributes corresponding to instances associated with the potential entity names; and
   update the knowledge graph with the updated matching candidate entity records and with new entity records for unmatched potential entity names, wherein the unmatched potential entity names are defined by ones of the potential entity names that do not match with any of the set of candidate entity records.

14. The non-transitory computer-readable medium of claim 13, wherein the instructions to link the potential entity names with at least partial matching ones of the set of candidate entity records to define updated matching candidate entity records comprise instructions to:
   determine that one of the enterprise source documents associated with a candidate entity record of the set of candidate entity records is more relevant to one of the potential entity names than the candidate entity record;
   link the one of the enterprise source documents to the one of the potential entity names; and store the one of the potential entity names in the knowledge graph as a new entity record.

15. The non-transitory computer-readable medium of claim 13, wherein a level of uncertainty is associated with each attribute associated with a potential entity name, wherein the instructions to query the knowledge graph comprises instructions to query the knowledge graph using alternative potential entity names based on the level of uncertainty.

16. The non-transitory computer-readable medium of claim 13, further comprising instructions to determine a level of uncertainty associated with a candidate entity record of the set of candidate entity records based on supporting documents associated with the candidate entity record in the knowledge graph, wherein linking the potential entity names with at least partial matching ones of the set of candidate entity records comprises linking one or more of the potential entity names with the candidate entity record based on the one or more of the potential entity names partially matching the candidate entity record according to the level of uncertainty of the candidate entity record.

17. The non-transitory computer-readable medium of claim 13, further comprising instructions to display at least a portion of an entity page including a plurality of attributes of an entity record in the knowledge graph to a user based on permissions of the user to view the enterprise source documents associated with the entity record.

\* \* \* \* \*